US008157381B2

(12) United States Patent
DeCusatis et al.

(10) Patent No.: US 8,157,381 B2
(45) Date of Patent: Apr. 17, 2012

(54) METHOD TO SYNCHRONIZE STEREOGRAPHIC HARDWARE TO SEQUENTIAL COLOR RENDERING APPARATUS

(75) Inventors: Casimer M. DeCusatis, Poughkeepsie, NY (US); Timothy M. Trifilo, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 1433 days.

(21) Appl. No.: 11/314,260

(22) Filed: Dec. 21, 2005

(65) Prior Publication Data

US 2007/0139616 A1 Jun. 21, 2007

(51) Int. Cl.
*G03B 21/00* (2006.01)
*G03B 21/14* (2006.01)
*G03B 35/16* (2006.01)
*H04N 9/12* (2006.01)
*G01B 11/26* (2006.01)
*G02B 27/22* (2006.01)

(52) U.S. Cl. .................... 353/7; 353/8; 353/84; 353/20; 348/743; 352/62; 356/141.1; 359/464

(58) Field of Classification Search .................. 353/7–8, 353/84, 20; 348/743, 218.1; 352/62; 356/141.1; 359/464
See application file for complete search history.

(56) References Cited

U.S. PATENT DOCUMENTS

| | | |
|---|---|---|
| 1,879,793 A | 9/1932 | Chubb |
| 2,571,612 A | 2/1948 | Rines |
| 4,486,095 A | 12/1984 | Mitchelson |
| 5,365,283 A | 11/1994 | Doherty et al. |
| 5,608,211 A | 3/1997 | Hirono et al. |
| 5,967,636 A | 10/1999 | Stark et al. |
| 5,993,004 A | 11/1999 | Moseley et al. |
| 6,069,733 A | 5/2000 | Spink et al. |
| 6,108,053 A | 8/2000 | Pettitt et al. |
| 6,147,674 A | 11/2000 | Rosenberg et al. |
| 6,449,309 B1 | 9/2002 | Tabata |
| 6,535,241 B1 | 3/2003 | McDowall et al. |
| 6,549,650 B1 | 4/2003 | Ishikawa et al. |
| 6,609,977 B1 | 8/2003 | Shimizu et al. |
| 6,676,259 B1 | 1/2004 | Trifilo |
| 6,924,833 B1 | 8/2005 | McDowall et al. |
| 6,932,476 B2 | 8/2005 | Sudo et al. |
| RE39,342 E | 10/2006 | Starks et al. |

(Continued)

FOREIGN PATENT DOCUMENTS

JP 10-153755 9/1995

(Continued)

OTHER PUBLICATIONS

The I2C-Bus Specification, Version 2.1, Jan. 2000, Phillips Corporation, 9398 393 40011, pp. 1-45.

(Continued)

*Primary Examiner* — Georgia Y Epps
*Assistant Examiner* — Magda Cruz
(74) *Attorney, Agent, or Firm* — Steven Chiu

(57) ABSTRACT

A method and apparatus for extracting synchronization information at the output of a projection apparatus, without modifying its rotating color segmented filter wheel or drive electronics. Three photodiodes, each with a different principle color filter, is placed at the projector output to detect output of the different colors in the filter wheel. An exclusive OR circuit is used to detect white light passing through the filter wheel.

5 Claims, 14 Drawing Sheets

U.S. PATENT DOCUMENTS

| | | | |
|---|---|---|---|
| 7,635,189 B2 | 12/2009 | DeCusatis et al. | |
| 2001/0015753 A1 | 8/2001 | Myers | |
| 2002/0118276 A1 | 8/2002 | Seong | |
| 2002/0140910 A1* | 10/2002 | Stark et al. | 353/84 |
| 2002/0149941 A1 | 10/2002 | Mateescu et al. | |
| 2002/0196332 A1 | 12/2002 | Lipton et al. | |
| 2003/0112507 A1 | 6/2003 | Divelbiss et al. | |
| 2003/0214631 A1 | 11/2003 | Svardal et al. | |
| 2004/0041747 A1 | 3/2004 | Uehara et al. | |
| 2004/0095767 A1 | 5/2004 | Ohmae et al. | |
| 2004/0100484 A1 | 5/2004 | Barrett | |
| 2005/0041163 A1* | 2/2005 | Butler-Smith et al. | 348/744 |
| 2005/0046700 A1 | 3/2005 | Bracke | |
| 2005/0179823 A1 | 8/2005 | Kim et al. | |
| 2005/0179824 A1 | 8/2005 | Ahn | |
| 2005/0189823 A1 | 9/2005 | Backs | |
| 2005/0212980 A1 | 9/2005 | Miyazaki | |
| 2005/0225630 A1 | 10/2005 | Childers et al. | |
| 2005/0237487 A1 | 10/2005 | Chang | |
| 2006/0100021 A1 | 5/2006 | Yoshino et al. | |
| 2006/0114362 A1 | 6/2006 | Kim et al. | |
| 2006/0256287 A1 | 11/2006 | Jacobs | |
| 2007/0139519 A1 | 6/2007 | DeCusatis et al. | |
| 2007/0139616 A1 | 6/2007 | DeCusatis et al. | |
| 2007/0139617 A1 | 6/2007 | DeCusatis et al. | |
| 2007/0139618 A1 | 6/2007 | DeCusatis et al. | |
| 2007/0139619 A1 | 6/2007 | DeCusatis et al. | |
| 2007/0139769 A1 | 6/2007 | DeCusatis et al. | |
| 2008/0055401 A1 | 3/2008 | DeCusatis et al. | |
| 2008/0055402 A1 | 3/2008 | DeCusatis et al. | |
| 2008/0055546 A1 | 3/2008 | DeCusatis et al. | |
| 2009/0190095 A1 | 7/2009 | Ellinger et al. | |
| 2010/0231695 A1 | 9/2010 | Decusatis et al. | |

FOREIGN PATENT DOCUMENTS

| | | |
|---|---|---|
| WO | WO 2005112440 | 11/2005 |

OTHER PUBLICATIONS

Office Action dated Jun. 4, 2010, U.S. Appl. No. 11/314,419, filed Dec. 21, 2005.
Office Action dated Apr. 29, 2009, U.S. Appl. No. 11/314,389, filed Dec. 21, 2005.
Office Action dated Dec. 9, 2008, U.S. Appl. No. 11/314,388, filed Dec. 21, 2005.
Office Action dated Jul. 13, 2009, U.S. Appl. No. 11/314,327, filed Dec. 21, 2005.
Office Action dated Dec. 12, 2008, U.S. Appl. No. 11/314,327, filed Dec. 21, 2005.
USPTO U.S. Appl. No. 11/314,379 to DeCusatis et al, filed Dec. 21, 2005, Office Action dated Sep. 30, 2010.
USPTO U.S. Appl. No. 11/314,383 to DeCusatis et al., filed Dec. 21, 2005, Office Action dated Sep. 13, 2010.
USPTO U.S. Appl. No. 11/314,419 to DeCusatis et al., filed Dec. 21, 2005, Notice of Allowance dated Sep. 15, 2010.
USPTO U.S. Appl. No. 11/468,370 to DeCusatis et al filed Aug. 30, 2006, Office Action dated Sep. 23, 2010.
USPTO U.S. Appl. No. 11/314,379 filed Dec. 21, 2005 to DeCusatis et al.,Notice of Allowance dated Jan. 24, 2011.
USPTO U.S. Appl. No. 11/468,370 filed Aug. 30, 2006 to DeCusatis et al., Notice of Allowance dated Nov. 15, 2010.
USPTO U.S. Appl. No. 11/314,389 filed Dec. 21, 2005 to DeCusatis et al., Notice of Allowance dated Nov. 3, 2009.
USPTO U.S. Appl. No. 11/314,383 filed Dec. 21, 2005 to DeCusatis et al., Notice of Allowance dated Nov. 29, 2010.
USPTO U.S. Appl. No. 11/468,364 filed Aug. 30, 2006 to DeCusatis et al., Office Action dated Nov. 4, 2010.
USPTO U.S. Appl. No. 11/314,419 filed Dec. 21, 2005 to DeCusatis et al., Notice of Allowance dated Jan. 11, 2011.
USPTO U.S. Appl. No. 12/787,467 filed May 26, 2010 to DeCusatis et al., Notice of Allowance dated Jan. 11, 2011.
USPTO U.S. Appl. No. 11/314,389 filed Dec. 21, 2005 to DeCusatis et al., Notice of Allowance dated Oct. 29, 2010.
USPTO U.S. Appl. No. 11/468,370 filed Aug. 30, 2006 to DeCusatis et al, Office Action dated Mar. 4, 2011.
USPTO U.S. Appl. No. 11/468,369 filed Aug. 30, 2006 to DeCusatis et al, Office Action dated Mar. 17, 2011.
USPTO U.S. Appl. No. 11/468,364 filed Aug. 30, 2006 to DeCusatis et al, Final Office Action dated Feb. 24, 2011.
USPTO U.S. Appl. No. 11/468,369 filed Aug. 30, 2006 to Decusatis et al., Final Office Action dated Jul. 20, 2011.
USPTO U.S. Appl. No. 11/468,369 filed Aug. 30, 2006 to Decusatis et al., Office Action dated Nov. 2, 2011.

* cited by examiner

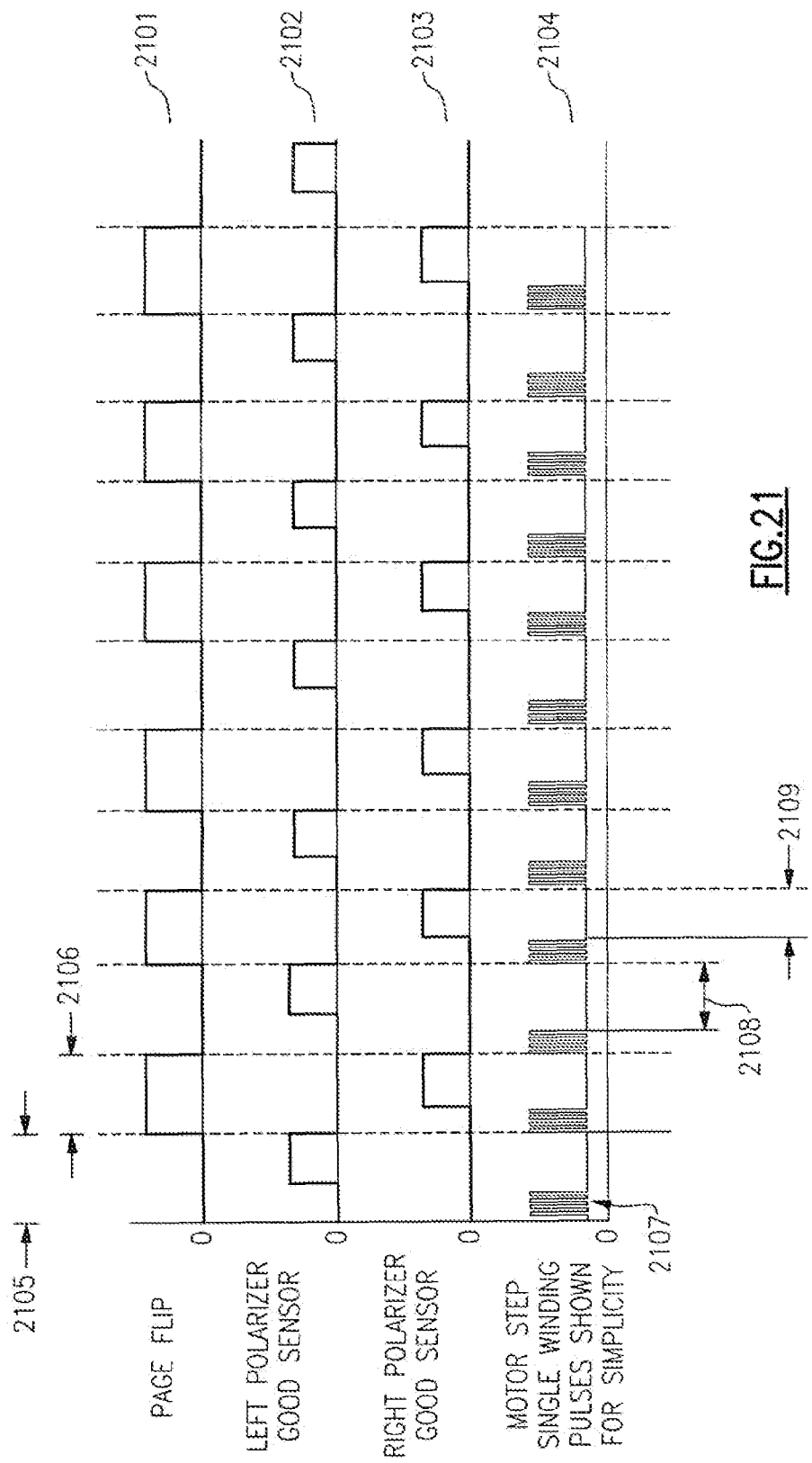

METHOD TO SYNCHRONIZE STEREOGRAPHIC HARDWARE TO SEQUENTIAL COLOR RENDERING APPARATUS

CROSS REFERENCES TO RELATED APPLICATIONS

U.S. patent applications Ser. No. 11/314,327, entitled "Lumen optimized stereo projector using a plurality of polarizing filters"; and Ser. No. 11/314,379, entitled "Stereographic projection apparatus with passive eyewear utilizing a continuously variable polarizing element"; and Ser. No. 11/314,419, entitled "Universal stereographic trigger peripheral for electronic equipment"; and Ser. No. 11/314,388, entitled "Method and system for synchronizing opto-mechanical filters to a series of video synchronization pulses and derivatives thereof"; and Ser. No. 11/314,389, entitled "Noise Immune Optical Encoder for High Ambient Light Projection Imaging Systems"; and Ser. No. 11/314,383, entitled "Signal Synthesizer for Periodic Acceleration and Deceleration of Rotating Optical Devices", all filed concurrently herewith are assigned to the same assignee hereof and contain subject matter related, in certain respect, to the subject matter of the present application. The above-identified patent applications are incorporated herein by reference in their entirety.

BACKGROUND OF THE INVENTION

1. Technical Field of the Invention

This invention describes a method and apparatus for detecting the position of a multiple color filter in a color imaging system, and distinguishing between the presence of a color filter and a white balance filter. The invention enables electronic signals to be synchronized in phase and frequency with the filter elements in a color imaging projection system.

2. Description of the Prior Art

FIG. 1 shows a prior art 3D imaging system that illustrates several fundamental requirements for 3D image projection. First, two two-dimensional ("2D") images of one scene are displayed, such as by a projection apparatus, one of which is slightly different than the second in terms of a line of sight perspective. These perspectives typically differentiate a left eye view from a right eye view. This normally requires dual image recordation in order to provide the two perspectives, or views, as described above, of the same scene. However, such perspectives could be processed, or manually generated. FIG. 1 illustrates two projectors 101 one of which projects a left eye perspective of a scene while the other simultaneously projects a right eye perspective of the same scene.

Although, simultaneous projection requires two projectors, it is possible to implement a single projector in a 3D imaging system by rapidly alternating the left and right eye perspectives during projection. The present invention does not require that the 3D recordation be done with any specific equipment or number of cameras, only that two perspectives be obtainable or derivable from image data and are capable of being displayed.

Another fundamental requirement of conventional 3D imaging systems is to expose one of the projected perspectives to only one of either the left or right eye and to expose the other of the projected perspectives to only the other eye, such that each projected perspective is seen exclusively with one eye. Thus, with a dual simultaneous projection system, one eye of a viewer will be blocked from seeing the image content from one of the projectors and the other eye will be blocked from seeing the image content from the other projector.

This blocking, often referred to as extinguishing, can be accomplished in two steps. First, each of the simultaneously projected images is polarized at a different polarizing angle by projecting each of them through separately angled polarized transparent media 102. The viewer wears passive polarized eyewear 103 whose lenses are also offset polarized, with respect to each of their polarizing angles, such that one of the lenses will block a first one of the polarized projected images and the other lens will block the second one of the polarized projected images. Prior art methods of generating two different perspectival images include differentiation of the images via red and blue color coding, such as those used with passive eyewear having a blue and red lens.

There have been many attempts to generate 3D image systems. We are concerned here with 3D imaging in systems which use polarization encoding of the left and right eye views, which may be implemented using a switched system Prior art in this field typically relies upon an integrated color wheel/polarizing filter, for example, in systems compatible with digital light processor ("DLP") or grating light valve ("GLV") technologies. This creates various problems because as the polarizer rotates it causes the polarization transmission axis of the image to rotate also. In other words, as the polarizer rotates the left and right eye views are only completely isolated for certain precise rotational positions of the polarizer wheel. For other positions of the wheel, the image will contain small components of both the left and right eye views, which cannot be separated by the use of passive polarizing viewing glasses. This results in ghosting of the image; the viewer will perceive a blurred mixture of left and right eye views sometimes, rather than a clear image resulting from total separation of the left and right eye views.

Modern front and rear projection color imaging systems, such as DLP technology, employ multiple color filters to sequentially project elements of a full color image onto a screen. These color filters are typically implemented as segments on a color filter wheel, which spins at a rate synchronized with the input video stream. Typically, this approach uses the three basic video imaging colors (red, blue, and green) in combination with a high brightness white light source. In order to facilitate white balance of the image and correct for certain kinds of image aberrations, a transparent filter segment is often incorporated into the color filter wheel, allowing white light to pass through to the screen.

Existing front and rear projection image systems, such as DLPs, micromirrors, gratings, or related technologies require high intensity white light sources to produce bright images. Despite the use of guiding lenses and optics within these systems, there can be relatively high levels of stray light reflected throughout the interior of the projector package. Some stray light can also leak in from outside the projector through seams in the case. This stray light becomes a problem when we use an optical sensor to synchronize the projector polarizer filter wheel with a stereoscopic imaging device. Stray light can cause false triggering of the sensors and disrupt the required frequency and phase synchronization.

In order to modify these imaging systems so that they support the transmission of stereoscopic three-dimensional images, it is necessary for them to provide alternating left and right eye views. For example, by using a rotating polarizer and having the viewer wear passive eyewear. The alternate eye views are provided by an additional filtering apparatus, which may not be part of the same color filter wheel used in the projector. In this case, it becomes necessary to synchronize the phase, frequency, and possibly other attributes of the rotating color filter wheel with an external stereoscopic imaging element. This synchronization is not necessarily achieved simply by accessing the electronic signals used to control the color filter wheel.

While it is possible to generate stereographic, three dimensional imaging from personal computers and other digital video devices, existing video game consoles lack the standard interface required for generating a video synchronization signal. Shortcomings of systems that employ rotating optics are many. In these systems, it is desirable that the optical device not rotate at a fixed speed. Rotational control improvements are realized by manipulating the speed of the rotating optics at rotational subintervals as dictated by a periodic disturbance signal and cooperative processing apparatus, as described herein.

Published patent application US 2005/0041163A1 describes the use of a segmented polarizer attached to the color filter wheel inside a digital light processor ("DLP") projector. It does not describe any required relationship between the projector lens optics and the rotating polarizer with respect to polarization sensitivity. Thus, the projection lenses and other optics may corrupt the polarization encoded image signal. Details of the synchronization required between the filter wheel and polarization wheel are not described, nor is there any reference to the distinction between frame sequential and other types of video input. This prior art will not work for all types of video input such as line interleaved video streams. The above-identified patent application is incorporated herein by reference in its entirety.

U.S. Pat. No. 5,993,004 describes a stereoscopic display with a spatial light modulator and polarization modulator, using polarization preserving optics and special control signals for the modulation. As a general statement, this approach does not use rotating or alternating polarizers or digital mirror devices ("DMD") and DLP technology as our invention does. The above-identified patent is incorporated herein by reference in its entirety.

Published U.S. patent application 2005/0046700A1 describes two video processing devices which process at least four separate sequences of video images for projecting multiple image views on a screen simultaneously. At a high level, this approach does not use rotating or alternating polarizers or DMD/DLP technology as our invention does. The above-identified patent application is incorporated herein by reference in its entirety.

Published U.S. Application 2003/0112507 describes two embodiments for DMD devices, both of which use different rows or columns of the DMD device driven sequentially to provide different eye views of the same image. This approach is not related to the use of rotating or alternating polarizers or DLP technology as our invention is. The above-identified patent application is incorporated herein by reference in its entirety.

Published U.S. application 2003/0214631 describes a projector with a beam splitter to produce two light paths, each of which passes through a fixed polarizer and are later recombined with a special optical system. This approach does not use rotating or alternating polarizers or DMD/DLP technology as our invention does. The above-identified patent application is incorporated herein by reference in its entirety.

U.S. Pat. No. 1,879,793 describes the original motion picture projection system (similar to those later used in IMAX 3D applications) in which the rate of film passing through the projector is synchronized in some fashion with an external polarizing wheel or slides. This approach does not use DLP technology and it is not extensible to DLP technology since it requires special film processing techniques. The above-identified patent is incorporated herein by reference in its entirety.

In the personal computer ("PC") industry, liquid crystal display ("LCD") optical shutter glasses have become the standard for cathode ray tube ("CRT") and projector viewing for color 3D imagery. However, this requires active eyewear (with a miniature liquid crystal monitor or shutter in each lens), as well as requiring a battery and connection to the data source for synchronization purposes. These solutions also tend to be expensive, are only practical for a limited number of users at one time, and tend to induce eye strain after prolonged use. These glasses typically use the Display Data Channel industry standard contained in every modern video adaptor card interface. This data channel signals the glasses that the PC has swapped its eye view.

As a totality, the prior art techniques require modifications internal to the projector filter wheel, and do not provide implementations using legacy systems. Frame sequential and line interleaved technologies are not differentiated in the prior art, which vaguely describes that the signals must be "synchronized" with the polarizer, without providing technical specifications. The prior art does not specify any form for the control circuitry that is not obvious to one skilled in the art.

In general, the prior art requires the projector to use internal optics which are polarization insensitive, since the light polarization must be maintained from the filter wheel through the rest of the projection path. This means that special optics must be used, and polarization sensitive coatings must be avoided, thereby increasing both the complexity and implementation cost. There are no such requirements in the present invention.

SUMMARY OF THE INVENTION

The shortcomings of the prior art are overcome and additional advantages are provided through the use of a sensor system employing one or more photosensors, with appropriate color filters on each sensor to detect the position of the color wheel at any instant. In another embodiment of the present invention, we provide a new method for extracting synchronization information at the light output of the projection apparatus, without modifying the filter wheel or its drive electronics. This solution compensates for the use of multiple color filter segments and white balance segments, can be adapted to any type of projection system, and provides higher quality images with less flicker and better depth of field than previous approaches.

A 3D projection system that includes a light projected image beam for projecting stereographic image data that contains a number of image streams and a screen for viewing the projected images uses a rotating color filter wheel to provide color to the projected images, for example, a DLP projection system. For 3D viewing the projection system alternately projects frames from each of the image streams which comprise left and right eye views. The rotating segmented color wheel provides color to the image by passing the image beam through it. Color sensitive detectors located in the image beam can detect each of the color segments and output a color signal when its corresponding color is detected in the image beam. These can be used to synchronize polarization of projected frames from the image streams to provide improved 3D image projection. The polarization can include the use of another rotating filter constructed out of polarized, mostly transparent media.

A method of the present invention includes receiving image data comprising a plurality of image streams wherein each of the image streams contain frames. These can be projected by, for example, a light source projector to generate various images on a motion picture screen, for example. In a DLP system, the projecting step comprises color filtering each frame of the image streams through a plurality of filter colors sequentially at a preselected color filter frequency and alternating frame projection from each of the image streams. A 3D effect can be produced by filtering frames projected from a first one of the image streams through a first angle polarizing filter and filtering frames projected from a second one of the image streams through a second angle polarizing filter. The polarization filtering step can be synchronized with the color filtering step by detecting a rotational position of the color filter wheel. Photosensitive detectors placed in the projected light beam can detect individual colors output by the projection system and output a pulse for each color thus detected.

These, and other, aspects and objects of the present invention will be better appreciated and understood when considered in conjunction with the following description and the accompanying drawings. It should be understood, however, that the following description, while indicating preferred embodiments of the present invention and numerous specific details thereof, is given by way of illustration and not of limitation. Many changes and modifications may be made within the scope of the present invention without departing from the spirit thereof, and the invention includes all such modifications.

BRIEF DESCRIPTION OF THE DRAWINGS

FIG. 21 illustrates relevant inputs used by the filter wheel's motor controller.

BEST MODE FOR CARRYING OUT THE INVENTION

For generating three dimensional ("3D") images, two separate two dimensional ("2D") images representing two lines of sight of a 3D scene are required—one 2D image viewed by each of a person's eyes exclusive to each eye. The apparatus illustrated in FIG. 1 is a traditional 3D projection system that uses a two projection device to simultaneously overlap the images and achieve a stereoscopic display.

Figure 1:
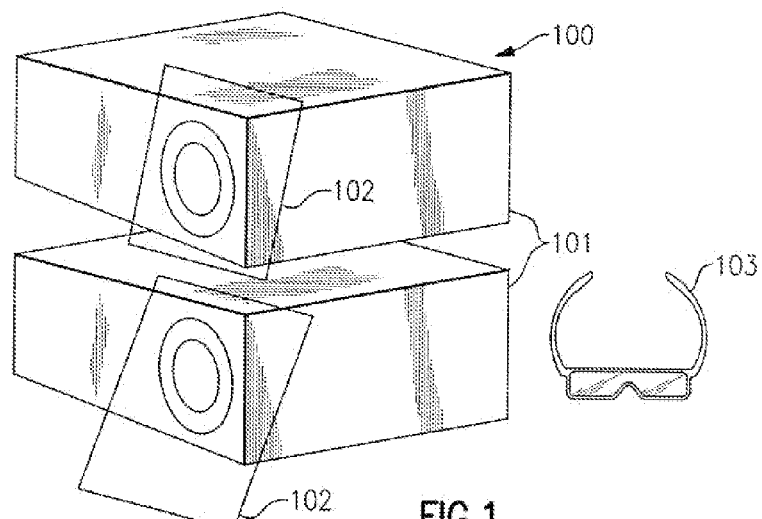
FIG. 1 illustrates a prior art dual projection system for 3D imaging.

With reference to FIG. 1, there is illustrated a prior art three dimensional projection system 100. This prior art utilizes two separate projectors 101 each projecting an identical scene but each with a slightly different perspective corresponding to the different perspectives between a person's left eye and right eye lines of sight. Polarized glass (or other material) filters 102 are placed in the paths of the projected light beams from each of the two projectors. The polarization angles of these filters are offset 90° from each other. In order for a viewer to perceive a three dimensional projected image, a viewer's left eye must be able to perceive the left designated two dimensional projected image from one of the projectors while simultaneously filtering out the right designated two dimensional image from the other projector, and vice versa for the right eye. This is accomplished by outfitting the viewer with passive polarized eyewear wherein each lens' polarization is offset 90° from one of the filters placed on the projector. Hence, each of a viewer's left and right eyes is exposed to a corresponding, separate, slightly different pre-selected two dimensional image which altogether results in the viewer's perception of a three dimensional image.

The setup shown in FIG. 1 requires the viewer to wear inexpensive polarized eyewear 103, but delivers rich colorful 3D images. The disadvantage to the above system is that special 3D conversion hardware and software is required to preprocess the image, which is not widely available. This same drawback has inhibited the adoption of other 3D projection systems, including liquid crystal based devices. In addition, a special screen is required to view these images, with a non-depolarizing surface. Recently, several systems have been announced which claim to provide 3D images without requiring glasses by projecting two separate images from dual projectors; this approach requires careful alignment between the viewer and the projector, and is not adaptable to multiple people viewing the same image.

Finally, the system cost is at least twice that of a single projector display system, and is not easily portable since it requires proper alignment between the two projectors and polarizing elements. Similarly, existing 3D movies are made with expensive multi-camera systems and utilize digital remastering or similar expensive film processing techniques; this high cost has inhibited the widespread adoption of 3D viewing systems, for example in home televisions.

The present invention provides 3D viewing using passive eyewear, thus reducing cost and avoiding eye strain and color perception issues associated with various alternatives. It can be used with a single projection source based on popular DLP technology, and may be realized as either an integral part of a projection system or as an add-on peripheral or stand that can be placed in front of a projector. This invention takes advantage of the prior art 3D interface support provided in popular software packages, such as the OpenGL™ or Direct3D™ application programming interface ("API"), which includes variants such as java3D™. This interface is compatible with the vast majority of 3D image software and programs in use today. All of these APIs generate digital content with left/right eye perspectives, for use with alternative technologies such as the active shutter glasses described previously; this content can be used without modifications by our proposed invention. Synchronization is provided by the device driver, left/right content is provided automatically in these APIs, you need only tell OpenGL™ or Direct3D™ to render in stereo, and it places the image streams in memory concurrently. The device driver is responsible for sending it where it needs to go (two projectors, one projector with page flipping, one projector with line interleaved stereo, for example). Other types of digital content may need to be preprocessed to generate left/right eye views compatible with 3D imaging techniques; however, for some types of content such as digital movies or electronic images this processing is fairly straightforward (other types of content, such as broadcast television, require additional, more complex processing to enable 3D viewing).

Figure 2:
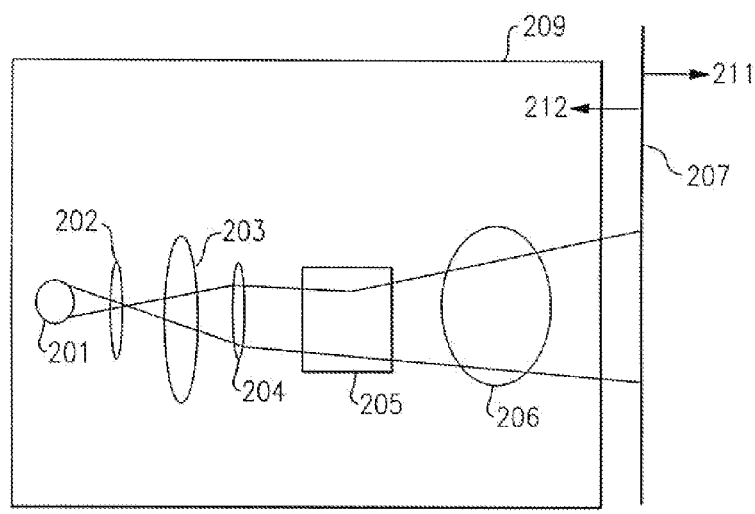
FIG. 2 illustrates a basic prior art DLP projection system.

Referring to FIG. 2, illustrated are the basic principles of an example DLP system 209. A white light source 201 is focused through a condensing lens 202 which then passes through a rotating color filter wheel 203. The filter wheel may contain the three principle colors used to create video and graphics images (red, green, and blue), or different colors. The present invention is not limited to using only a rotating color filter wheel. Other technologies may exist or may be developed which provide a directed light beam containing a projected image (such as digital frame sequential images, stereographic or not) that can be implemented with the present invention. The proposed invention is generally applicable to any light source projection system, typically a single light source that does not rely on polarization to create the image itself. Restated another way, the polarization of the light output of the imaging device used must be random. The presently proposed invention uses polarization techniques to produce 3D effects, therefore, projections systems that rely on polarization techniques themselves might interfere with polarization implementations in the present invention.

As shown in FIG. 2, the beam passes through the color filter wheel 203, through a focusing lens 204, and illuminates a DMD 205 which is driven by firmware from a video source, such as from a personal computer, DVD, a stored format, or a television signal, among others. Other possible video sources include grating light valve and phase change display technology.

The image content processed by the DMD is synchronized with the rotating color filter wheel such that the red content of the desired image illuminates the DMD when the red filter segment is aligned with the DMD while the focused light passes through it. The green image content illuminates the DMD when the green filter is aligned with the DMD, and so on. Thus, for each image frame that is projected by such a DLP system, the color filter wheel and DMD operate together to sequentially project several color planes for each image frame. The sequential parts of an image are then focused through additional projection optics 206 onto a screen 207 to create a suitable 2D image, which may be a still image or motion picture. Images projected by a front projection system would be viewed from the same side 212 of the screen 207 as the projection equipment. A rear projected image would be viewed from the side 211 opposite the projector equipment.

If the three color content is processed by the system shown in FIG. 2 at a sufficiently high frame rate, measured in frames per second, then persistence of vision will cause an observer to perceive a full color stable 2D image on the screen. There are many variations of this technology, including systems which use 2 or 3 DMD devices to create the final image, and systems which employ both rear projection and front projection techniques. Details of the optical elements used in the beam path, such as the condensing lenses and projection lenses, may also vary, and are not essential parts of the present invention. The dual projector apparatus shown in FIG. 1, for example, could be composed of two DLP projectors. Due to its performance and low cost, DLP is becoming a preferred technology for many large screen projection televisions, portable personal computer projectors, and similar applications.

Figure 3A:
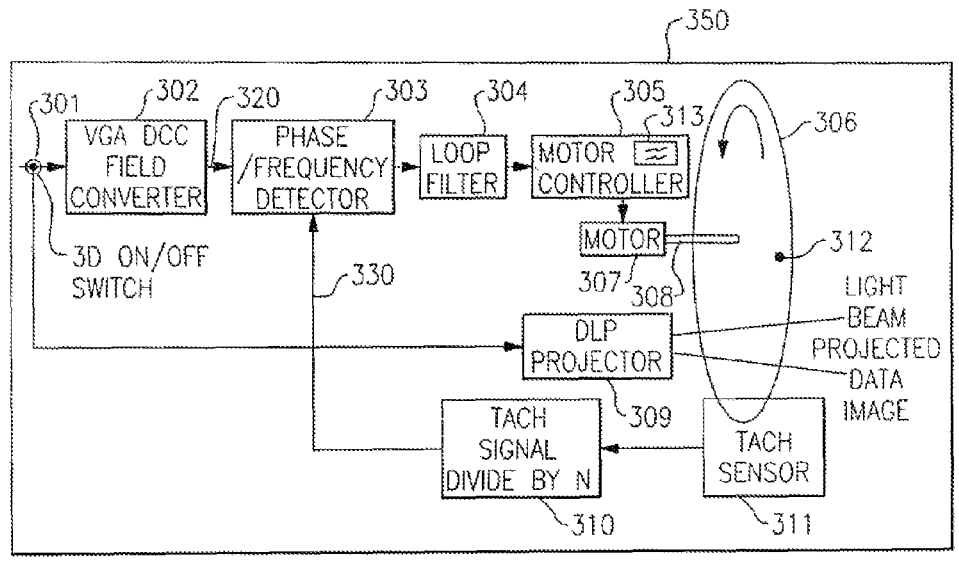
FIG. 3A illustrates the present invention implemented with the example DLP system of FIG. 2.

FIG. 3A illustrates a preferred embodiment of the present invention including a rotating, polarizing filter 306 which is mounted in front of an existing DLP projector 309, which may be implemented as a front or rear projection system. Variants of the present invention allow for use with rear projection systems and for integrating this invention internally to the projector. In alternate embodiments, the rotating polarizing element may also be replaced by a lever arm or similar linear displacement device which would serve the same purpose (i.e. alternately modulating the light with 2 different orthogonal states of polarization). In a time division multiplexed ("TDM") video stream, for example, a PC transmits page flipped stereo images, compatible with industry conventions such as the APIs discussed previously. Page flipping refers to the sequentially transmitted alternating left and right eye views, or frames, whose transmission speeds, or refresh rate, may vary from several to hundreds of Hertz. The left and right eye views are also often separately referred to as image streams even though they operate together to generate a 3D effect.

Note that there may not be any additional optics in the light path beyond the polarizer unless they preserve the polarization state of the light. This is an important consideration if the polarizing wheel is to be integrated within the projector. The resulting image must also be projected on a screen or other surface which preserves polarization of the reflected light, or refracted light as in rear projection systems. Such screens are commercially available, for example by ScreenTech™, of Hamburg, Germany, and Da-lite™ of Warsaw, Ind., USA. We also note that our invention may apply to other types of image projection technology besides DMD/DLP; for example, the recently proposed grating light valve ("GLV") technology. GLV is an alternative to DLP and other light engine projection technologies, in which a combination of diffraction grating and liquid crystal technology is used to generate 2D images suitable for either rear or front projection systems.

With the present invention, passive polarizing eyewear can be used to view the full color 3D image(s). The proposed invention is intended to be used with the industry standard linearly polarized 3D glasses, having an orthogonal polarization orientation with 0° centered between left and right eye: left eye −45° with respect to 0°, and right eye +45° with respect to 0°. Obviously, these angle orientations are not a requirement of the present invention but are selected merely for industry compatibility. The present invention can be easily adjusted for implementation using other angular relationships. It will be apparent to those skilled in the art that minor adjustments to the invention will allow the use of passive eyewear with lenses having different polarization orientations as well as circular or elliptical polarization states. Circular and elliptical polarized passive eyewear is commercially available.

It is well known that given a sufficiently fast video refresh rate, the human eye's persistence of vision will cause it to perceive a true color 3D image, given an appropriately presented series of 2D images. In this way, an existing DLP projector can be upgraded to project 3D images, by implementing an external device to be placed at the output aperture of the projector, thereby requiring no modification to the original projector hardware or firmware. Note that frame sequential video signals must be used in order to achieve this effect with the present invention. Frame sequential video signals describe a time division multiplexed signal of alternating left-eye designated and right-eye designated images. This means that individually transmitted images each representing a left or right eye view are sequentially received and handled by the projection system. Although it may be ideal to alternate a left and a right eye view with each projected frame, as is the intent of the design of many digital stereographic systems, other designs may also produce a substantial 3D effect by taking advantage of the human eye's persistence of vision.

Video Input Signal

The incoming stereo signal (e.g. 301 of FIG. 3B) typically is one that is purposely produced for 3D stereo imaging, e.g. computer software video shot with dual lens cameras. However, the incoming image data can come from a source such as video game, PC, or digital television data. A stereo VGA signal, and added information such as DDC, HDMI, High Def, Multi Media Interface, and Y—Pr—Pb from digital cable boxes and DVD players are also suitable. A minimum requirement for the present invention is an input containing stereo video data, which means that dual left/right images can be obtained, derived, or processed from the video data. Video data can also be transmitted via packets, frames, or cells wherein header information can be used to indicate left or right eye content in the payload. In such an implementation, a 3D movie can be transmitted over the internet, and stored indefinitely, or projected for viewing as it is received, such as in real time video streaming. Some industry standard signals, such as HDMI, would need to implement a preliminary circuit for extracting the sync signal (page flip signal) from the incoming video data. Thus, an HDMI input stream would work with the present invention using a page flipping extractor whose output is provided to the phase/freq detector. HDMI input is provided with page flip information on the input data. For the presently described embodiments, we assume that the incoming video signal is an industry standard stereo VGA signal.

Embedded in the VGA standard is a "DDC" capability which is a low bandwidth digital message interface implemented typically with a bidirectional serial bus, to send page flip signals in parallel with the left/right images indicating which of either left or right image is currently being transmitted.

Industry standard protocols such as stereo VGA provide fixed known rates for the incoming frames, e.g. 60 Hz, 85 Hz, 100 Hz, or 120 Hz, where the stereo rate is half of that, thereby transmitting half as many of each left and right eye frames/images per second. Many computer programs also provide digital stereo image sources such as video games, architectural graphics programs, CAD programs, and medical imaging programs, as examples, which contain stereo VGA signals.

With respect to FIG. 3A, illustrated is the inventive 3D projection system 350 implemented with a conventional DLP projector 309. An incoming stereo video signal (e.g. TDM frame sequential) 301 is received by the conventional DLP projector which then decodes and projects the video image. In parallel with the DLP projector, the present invention receives the incoming stereo video synchronization signal and extracts the stereo sync signal 302, i.e. the page flip signal, embedded therein and provides it to the phase and frequency detector ("phase/freq detector") 303. The stereo sync signal indicates which of the two stereo images is present in the video stream at any instant of time. In the present invention, each of the two stereo image streams will be modulated as a left eye designated or right eye designated. The extraction circuit is a well known VGA field converter circuit implementing the well know DDC page flip protocol. eDimensional™, Inc. of West Palm Beach, Fla., provides circuits for connecting to a stereo VGA signal which then outputs the page flip signal together with the video stream. The well known DDC algorithm can also be manually implemented by executing it on any of a variety of processors.

An incoming 2D signal can be switched directly to the DLP system and bypass the 3D imaging circuits by implementing a simple switch at 301. Optionally, the 3D imaging path can be outfitted with detection circuits that automatically detect incoming multiple image streams and automatically send those signals to the 3D generating technology of the present invention. Such an automatic activation option could also be manually disabled. These alternative embodiments are considered to be simple adjustments to the present invention and do not fall outside the scope of the present claims.

Field Converter

Figure 3B:
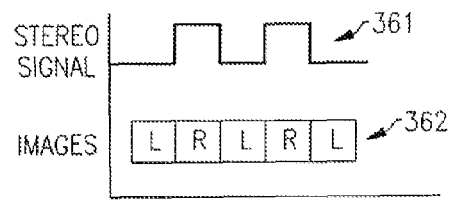
FIG. 3B illustrates a page flip signal with corresponding image data frames.

The input signal is received by a field converter that extracts the page flip signal, as described above, which indicates which of left or right eye data is present in the signal. The video data continues to be provided to the DLP projector while the page flip data is used by the circuitry of the present invention. The output signal of the field converter 361 (of FIG. 3B) alternates between an indication for left eye view and an indication for a right eye view. In a limited embodiment, this output signal could be a simple binary square wave output, as illustrated in FIG. 3B, and is provided to the phase/freq detector. The square wave 361 indicates, for example, that the logical "1" (or higher voltage level) corresponds to right eye data, designated "R", in the video stream 362. A logical "0" (lower voltage level) indicates a corresponding left eye image, designated "L", being transmitted in the image data 362.

Phase/Frequency Detector

A preferred embodiment of the present invention uses positive edge triggering, or edge sensitive triggering, to generate the required signals. An alternate embodiment could use level sensitive triggering, in which the signal is switched based on its amplitude crossing a preselected threshold. Level sensitivity implies variability in duration, since the signal amplitude levels can drift or move because of effects such as noise and ground shifts. Thus, there must be a defined tolerance around the specified shift levels to account for these factors in a practical design.

Referring to FIG. 3A, the phase frequency detector 303 compares a rotational speed of the filter wheel 306 with the frequency of the page flip signals 361 output by the field converter 302. It is necessary for the filter wheel to be in a certain rotational position when each of the left and right eye views is transmitted through the filter and onto a viewable screen. When a left eye image is being projected, it must be filtered by the polarized filter wheel at a particular polarization angle so as to block the image from a viewer's right eye, wherein the viewer is wearing appropriate polarized passive eyewear. This blocking is accomplished by having the filter wheel polarize the image at an angle 90° offset from the viewer's eyeglass right side lens. Therefore, the phase/freq detector synchronizes the incoming page flip signals with rotational information it receives from the tach sensor 310 and 311. If the filter wheel is unacceptably lagging or advancing ahead of the page flip signals, the phase frequency detector will output a correction signal to the filter wheel motor controller 305 which will adjust the filter wheel rotational speed accordingly. Implementing positive edge triggering circuitry in the phase/freq detector provides the sharpest time detection, as compared with level sensitive designs.

Figure 4:
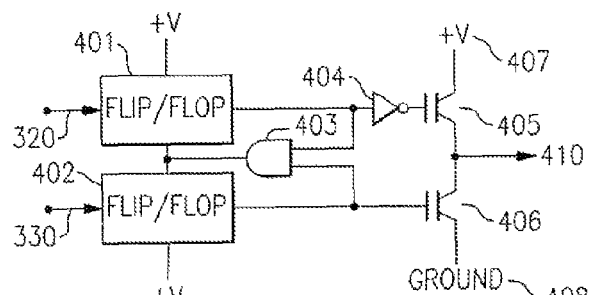
FIG. 4 illustrates a phase and frequency detector.

The present DLP projector output and video stream synchronization can be implemented, in part, using the circuitry design illustrated in FIG. 4, which illustrates one embodiment of a phase/freq detector. One input to the phase/freq detector 401 receives the output 320 of the field converter. The other input 402 receives the output 330 from the tach sensor circuit. The output of this circuit will be a voltage equal to the midpoint of the voltage sources 407 and 408 only when the rotational speed of the filter wheel is in proper synchronization, both phase and frequency, with the incoming page flip signals. In the present embodiment a 5v voltage source at 407 was implemented with a ground voltage (0) at 408. This circuit would indicate synchronization, or quiescent operation, at a 2.5 v output at 410. Deviations from synchronization, either lagging or advancing, would cause the phase/freq detector to output a corresponding correction signal 410, varying from the ideal 2.5v output, to the motor controller. If the tach signal and phase/freq detector output drift out of lock with each other, then the output of the phase/freq detector will be proportional to the amount of drift and will output a positive or negative signal for causing the motor control to increase or decrease the speed of the motor.

Referring to FIG. 4, flip/flop circuits 401 and 402 can be implemented with chip type 74LS174; AND gate 403 can be a 74LS21; and inverter 404 a 74LS04. PFET 405 and NFET 406 comprise a well know charge pump configuration, and should be properly sized to handle the currents needed for driving the motor control signals.

As described above, the phase/freq detector receives the left/right signals from the field converter. Eventually, these left right indicators are used by the present invention to control the polarized filter wheel such that when left eye data is being projected toward a screen the polarizing filter wheel will be in a position such that the polarization angle of the wheel polarizes the left eye projected image at a pre-selected angle, and that the right eye projected image is polarized by the filter wheel at a different pre-selected image. These pre-selected polarization angles are selected with foreknowledge of the polarization angles of the passive eyewear lenses worn by a viewer. The angle of polarization in combination with the polarizing angle of the passive eyewear will cancel the projected left eye image from being seen by a viewer's right eye, and vice versa.

As illustrated in FIG. 3A, a second input 330 to the phase/freq detector is a frequency of the rotating filter wheel. This frequency is detected with a tachometer sensor 311 coupled to the filter wheel. The phase/frequency detector forms the input to a feedback loop to control the rotational speed of the polarizing filter wheel for maintaining phase and frequency lock between the filter wheel and the stereo video stream. The phase lock may be controlled to within a fixed acceptable offset.

Loop Filter and Motor Control

Figure 5:
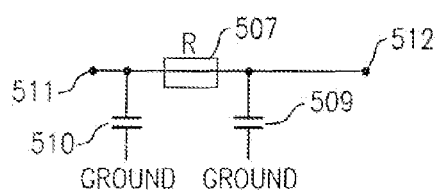
FIG. 5 illustrates a loop filter.

The loop filter, illustrated in FIG. 5, will receive and convert the output of the phase/freq detector at input 511 to a DC output at 512 whose magnitude is proportional to the amount of offset detected by the phase/freq detector and whose sign is proportional to the direction of offset. The equilibrium point is midway between the upper and lower voltage rails of the phase/freq circuit, which could be 2.5v for a 0-5V system, or 0v for a +/− power supply. The output signal of the loop filter will drive the motor controller of the filter wheel.

The capacitors of this loop circuit can be sized approximately 0.1 μF for capacitor 510 and 0.22 μF for capacitor 509, and resistor 507 is 4.7 kΩ. The sizes of these components should be selected so as to compliment the gain/phase response of the entire system, including the gain of the motor control amplifier, all of which are well accepted principles of electronic design.

An off the shelf spindle motor drive ASIC, often used for driving optical disc rotation such as in DVD players, can be used as the motor controller 305, and typical DVD motor drives can be implemented as the motor 307 in the present implementation. A DSP (microprocessor control) can also be implemented and programmed with firmware or software 313 as a motor controller, such as Texas Instruments TMS320LF2401A, for example. The motor preferably is a 3-phase brushless DC motor including Hall Effect sensors. It should be well understood by those skilled in the art that any of the above components can be selected and/or designed for particular applications and environments without deviating from the spirit of the present invention. For example, any simple motor whose speed is responsive, and proportional, to input voltage can be used. A motor can also be coupled to the filter wheel such that a friction wheel, e.g. rubber, provides rotational force at its edge. Also, the sizes of the circuit elements obviously would be modified for implementation as semiconductor chips.

Tach Sensor

An example embodiment of the wheel tachometer 311 is one where the filter wheel contains a marker near its periphery 312, and the tach sensor contains a light source in alignment with a light sensitive diode (detector) while the filter wheel rotates therebetween with its marker passing directly between the light source and the detector. Each time the marker passes between the light source and the light sensitive diode, an electrical pulse is generated and sent to the phase/freq detector. Such an embodiment could implement a dark spot or a light spot on the filter wheel, or some other marker or multiple other markers, which causes the tachometric device to generate a pulse for each complete rotation, or known fraction of a rotation of the filter wheel.

Figure 6:
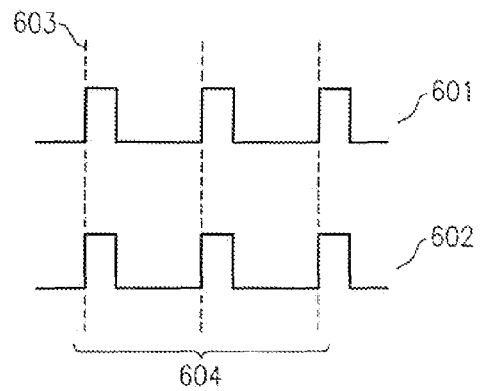
FIG. 6 illustrates phase and frequency lock.

FIG. 6 illustrates an example of phase and frequency lock between two square wave signals. The first square wave 601 may represent the sync signals received by the phase/freq detector and the second square wave 602 may represent the output of the tach sensor system 310 and 311. The phase and frequency detector, operating as an edge triggered device, will output a control signal to increase or decrease the speed at which the filter wheel motor rotates the filter wheel so that the tach signals received from the tach sensor system 602 tend to match the phase of the sync signals 601. This phase lock is illustrated by the rising front edge of both signals occurring at the same instant 603. Frequency lock is illustrated by the continuous simultaneity of the rising edges of these two signal waves 604.

Figure 7:
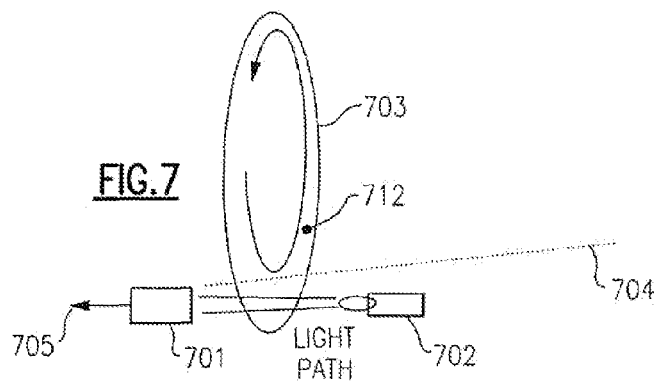
FIG. 7 illustrates a wheel with a tachometer sensor speed detector.

Referring to FIG. 7, an embodiment of a tach sensor is illustrated. A polarized filter wheel 703 with a marker 712 rotates, as indicated by the arrow, between an infrared light emitting diode 702 and a photosensitive detector 701.

As the marker passes through the LED light path the detector will transmit a pulse 705 to the divide-by-n circuit described below. A possible source of false triggers may be stray light entering the system, shown by 704.

A "divide by n" circuit 310 is connected to the output of the tach sensor to adjust for the number of discrete polarization windows provided on the filter wheel. Depending on the number of different polarization angles presented by one rotation of the filter wheel, the "divide by n" circuit will alter the pulse frequency sent to the phase/freq detector. Such "divide by n" circuitry is well know in the art and need is not discussed further herein. As an example, a "divide by four" circuit would receive an electronic pulse from the tach sensor for every single rotation of the filter wheel and output a pulse for every quarter rotation of the filter wheel, i.e. the "divide by four" circuit increases the pulse count by four times. If the rotating filter wheel is made of a uniform integral sample of polarized material, such as polarized glass, then there will be four discreet 90° states of polarization angles filtering the projected image, assuming that the light beam of the projected image passes through the filter wheel somewhat near the edge of the wheel (e.g. see FIG. 15C), as compared with projecting the image through the center of the filter wheel. Thus, the "divide by n" circuit would increase the output pulse by four times, or some other number depending how many discreet filtering states "n" are provided in the filter wheel.

It will be apparent that the invention allows for rotating wheels with an arbitrary number of polarizing segments. From the previous discussion, it will also be apparent that there is a relationship between the maximum phase offset of the signals produced by the phase/freq converter and the number of polarization states in the wheel. For example, if each output pulse from the tachometer represents a revolution of the wheel, we then have four discrete state spaces in which the system can operate. Dividing the entire period of rotation by four yields the maximum phase offset, in degrees, to within an arbitrary constant fraction of the bit period, k (i.e. max phase offset=k+360/4) This implies a maximum phase offset of one quarter of a bit period of the field converter (throughout this discussion we assume the use of a single polarized wheel without window segments for illustration purposes; the details can easily be altered by one skilled in the art to allow for different design points).

Filter Wheel

The filter wheel can be constructed of any transparent material preferably a homogeneously polarized, well balanced glass disc. A homogeneously polarized disc permits simpler manufacturing. A transparent wheel having selectively polarized sectors similar to the color wheel of the DLP could also be implemented. A wheel fabricated from some rigid material having closely spaced windows of selectively polarized material near the disc periphery could also be used, or a single such window could be placed in the center of the wheel if the light beam of the projected image is desired to be projected through the center of the filter wheel. A standard CD sized clear plastic with a polarized sheet adhered thereto could also be used. An alternate embodiment uses the polarizing wheel system as an integral internal component of a DLP projector.

Synchronization to Sequential Color Rendering Apparatus

In a conventional color image projection system (such as DLP, micromirror, or other technologies) a rotating color filter wheel with a white balance segment is employed to provide good image quality. In order to extend the function of these systems to enable stereoscopic three dimensional imaging, a separate stereoscopic element (for example, a rotating polarizer wheel) must be synchronized in phase, frequency, or other attributes with the existing color filter wheel, as described above. By avoiding modifications to the projector circuitry, this invention also is fully compatible with various projection system circuitry used to improve image quality, such as averaging over adjacent pixels to smooth the image and prevent aberrations.

Figure 8:
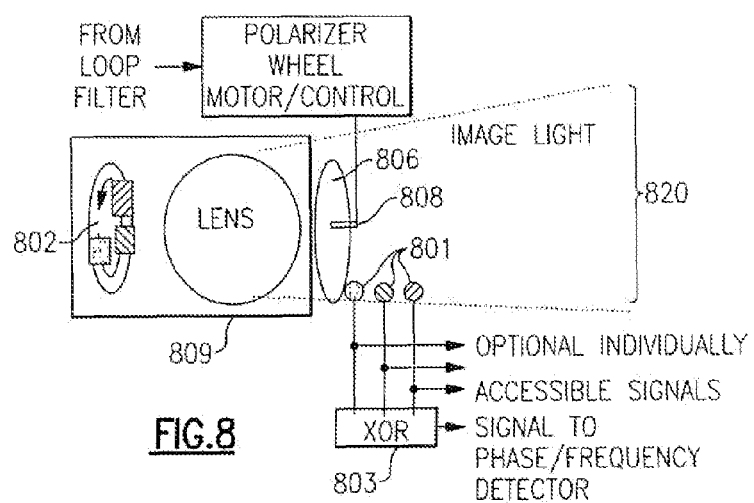
FIG. 8 illustrates an external color filter wheel sensor implementation.

Referring to FIG. 8, an effective synchronization signal, or page-flip signal, is derivable from a set of three photodetectors 801 placed anywhere in the output light path 820 of a projector, which intercept a very small fraction of the output light. This technique replaces the need to extract page flip signals from the video data stream itself, via the field converter described above. Each of these are coupled to an XOR such that they provide an output pulse whenever a corresponding color is present in the projector light output. The output of the XOR circuit is coupled to the phase/freq detector and replaces the page flip signal from the field converter. The three detectors are covered with three different color filters, matching the red, green, and blue principle colors used by the projector filter wheel 802, or other corresponding filter wheel colors. The outputs of these detectors are individually accessible (for optional alternate embodiments, which for example may use the output of a single detector in combination with the XOR circuit to determine the position of a given color filter segment), and in addition the exclusive OR circuit 803 function is performed on a combination of all three signals (when all three photodetectors output a pulse the XOR will output a single pulse). (The term "XOR circuit", "exclusive OR circuit", and "EXOR circuit" may be used interchangeably throughout the specification when referring to the "XOR circuit". They are preferentially placed near the edge of the illuminating beam 820, so as to minimally obstruct the light beam. This may also be facilitated by various methods which are apparent to one skilled in the art, such as employing a small partially reflective mirror to sample the light output and redirect it to the photodetectors. The detector array 801 together with XOR circuit 803 thus provides four possible individual output signals.

To illustrate operation of the invention, consider what happens when the filter wheel 802 is positioned with the red segment in front of the light source. In this case, only an external photodetector with a red detector will produce a signal, while the other two remain dark since the red light cannot penetrate their filters. When the red detector output is high and the others are low, this indicates that the red color filter wheel is positioned in front of the light source. Similarly, we can detect when the blue or green filter wheel is so positioned. Note that if the wheel 802 contains only three colors, it is now possible to trigger the stereoscopic element from the position of any given color. However, if the filter wheel contains a white segment, then each detector will trigger twice per rotation of the filter wheel (for example, the red detector will trigger both when the red filter is present and when the white filter is present, since white light contains red among its components). Furthermore, if the red/green/blue/white segments of the filter wheel are not of equal size, then the multiple trigger events will extend for different time durations.

We incorporate an EXCLUSIVE OR (XOR) circuit 803, which will only trigger when all three photodetectors 801 are illuminated equally (indicating the presence of white light). In this way, the exact position and duration of all filter wheel segments can be determined without modifications to the filter wheel circuitry. It should be kept in mind, as discussed above, that the color filter wheel rotates at an integer multiple of the frame rate and an appropriate divide-by circuit (not shown) is coupled to the output of the XOR circuit before forwarding the signal to the phase/freq detector. This approach works for any arbitrary size of color segments on the filter wheel. By tracking the exact position and duration of each color segment, including white, the polarizing filter wheel 806 (or other stereoscopic element) can be more accurately synchronized with the color filter wheel, and can remain synchronized even if higher speed filter wheels are used. Errors in the color wheel balance can be corrected during stereoscopic projection (for example, a red segment which is not the same size as the blue segment). The invention allows us to detect the position and size/duration of any color filter segment, including white; with this information, we can control the position of the polarizing wheel 806 (or similar stereoscopic element) to synchronize in frequency and phase with any desired color filter wheel segment.

The individual outputs from each of the color photodetectors could be usefully implemented for verification of duration of a particular color segment, number of segments, non-standard color segments, number of rotations per frame, etc.

Noise Immune Optical Encoder

To help maintain phase and freq synchronization, the tach sensor can be made to operate more accurately by avoiding false detections caused by stray light, or other dirt on the filter wheel. By adding an encoded (encrypted) pulse train source and detector to the tach sensor, this will filter out stray light incident on the light sensor which will generate false triggers.

Figure 9:
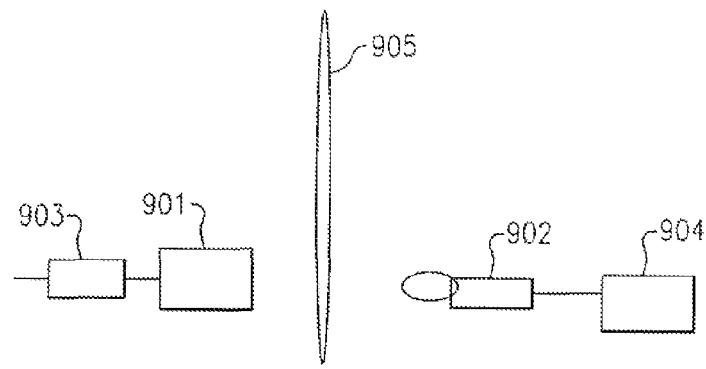
FIG. 9 illustrates a modulated LED with bandpass sensor.

An infrared light emitting diode (LED) transmitter can be modulated, rather than remain unmodulated without the present improvement, with a relatively low data rate (hundreds of kHz or less) signal, such as a sine wave taken from an on-board oscillator. The infrared receiver filter circuit can be tuned to accept only signals which fall within the passband of this signal. In this approach, a valid sensor signal would only be registered if the transmitter modulation was detected, so that stray light would not create a false sensor signal. This can be done by using a simple capacitive bandpass filter circuit, whose passband is centered on the center frequency of the on-board electronic oscillator and whose bandwidth is narrow enough to avoid passing harmonics of this oscillator frequency (typically under a few tens of kHz will suffice). FIG. 9 illustrates this simple improvement over the standard tach sensor configuration of FIG. 7, described above. The LED 902 and photosensitive detector 901 are arranged around filter wheel 905 as explained above with respect to FIG. 8. In addition, a low frequency oscillator 904 is coupled to the LED for causing it to transmit preselected detectable data to be filtered by passband filter 903. In this manner, unwanted stray light that might otherwise cause false triggering of the tach sensor can be filtered. Only a legitimate interruption of the bit stream caused by the filter wheel marker will trigger a tach sensor pulse.

In this approach, a valid sensor signal from the rotating wheel would only be registered if the LED transmitter modulation signal was detected. If stray light from another source illuminated the receiver, the resulting signal would fall outside the passband of the receiver filter circuit and hence would not be detected. In this manner, stray light would not create a false sensor signal. This method is expected to improve the signal-to-noise ratio of the rotating wheel measurement by 3 dB or more. This approach is also extensible to multiple sensor cases, such as those used to distinguish color filter wheel position. In fact, multiple rotating elements in the same projector can use this approach at the same time, provided that the modulation signals they use do not overlap at any of the receiver filters. For example, two separate modulation frequencies can be used to drive two LEDs, where the first LED measures the rotation speed of a color filter wheel, and the second LED measures the rotation speed of a stereoscopic wheel. As long as the two receiver circuits can distinguish between the two LED modulation frequencies, the two LEDs will not interfere with each other. This approach can be extended to an arbitrary number of rotational elements in a single imaging system.

Figure 10:
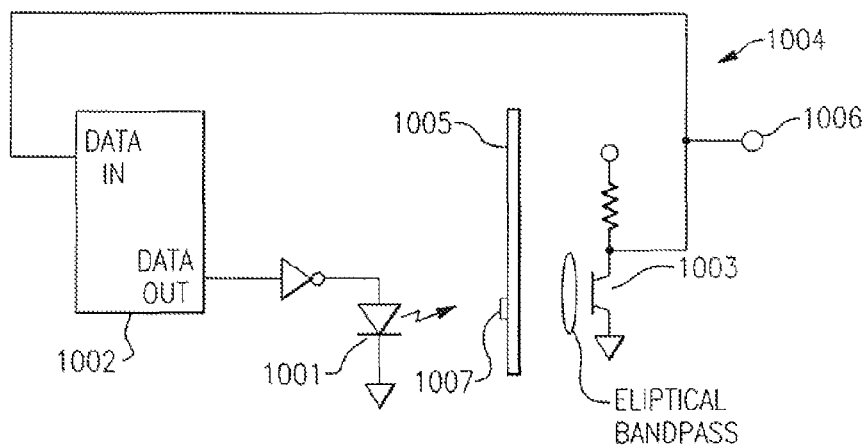
FIG. 10 illustrates implementation details for operating the modulated LED of FIG. 9.

Referring to FIG. 10, an exemplary tach sensor implementation 1004 would use an LED as a light source 1001 on one side of the filter wheel 1005 and a photosensitive diode 1003 on the other side of the filter wheel. A mark 1007 on the filter wheel triggers an output pulse from the photodetector 1003 at output 1006 for each revolution of the filter wheel, which is coupled to the "divide by n" circuit described above. The preferred embodiment comprises a bit stream verification circuit 1002, which generates a recognizable and repeatable 16 bit or 24 bit pattern (the number is not critical to the present invention so long as it is large enough to avoid a false trigger, i.e. random light noise in the projector environment repeats the bit pattern), that is verified by the microprocessor 1002 by detecting the repeating 16 or 24 bit sequence. This implementation is not required for the present embodiment, but is useful to avoid false triggers.

A transmission rate of the encoded bitstream at several hundred kHz and a marker on the filter wheel of approximately 2-3 degrees of the disc circumference, wherein a four-aspect disc is spinning at approximately 21.5 Hz for an 85 Hz video signal, is sufficient to interrupt thousands of encoded and transmitted bits in the bitstream and so provides a large reliable target for verifying detection of the marker as opposed to other random obstructions, e.g. dust, that may be present on the filter wheel. Variations from these design points are mere design selections which do not stray from the spirit of the present inventive embodiment.

Universal Stereographic Trigger Peripheral for Electronic Equipment

Many PCs, including Apple's Macintosh™ personal computers have the ability to run in 3D mode whereby two camera objects are instantiated by a 3D application programming interface ("API"), be it the OpenGL™ API or Microsoft's Direct3D™ API. A PC requires a device driver to trigger an external device (such as the shutter eyewear described above) to block one eye view or the other. We have referred to this trigger as a page flip signal and a sync signal above. These API technologies are an industry standard, as is the software to generate the 3D image pair. Our invention can be easily utilized with these standard interfaces and also allows use of passive eyewear and a single projection source in order to implement stereographic projection on these systems. These also allow the user to change the output frequency of the video card on the computer, including the page flip signal. This allows a wider range of computers and projectors to exploit the present invention. Additionally, software which enables page flipped stereo drivers would allow for broader applications of the present invention such as full motion digital video.

Standard video game platforms have a USB, or other industry standard, connector interface for attachment of peripheral devices. According to the present implementation, hardware is provided which attaches to the game platform USB bus and provides a synchronization signal at an output suitable for connection to a stereoscopic imaging/projection system. This hardware may consist of an electronic circuit with a USB connector interface on one side and an electronic connection on the other side which provides a compatible signal to the peripheral device (many type of connectors may satisfy this requirement, for example a 3 pin device with a vertical alignment key).

Stated another way, the present invention comprises a housing containing components that are coupled to both a video game platform having a USB port and a 3D television enabled with the stereographic projection apparatus described herein. This invention is useful for converting game platform signals so that they will display in 3D. The present invention works with PC or DVD player outputs and can be modified to work with a number of video game platforms. A synchronization signal can be extracted from a video game USB interface by utilizing one aspect of the present invention. The game platform video signal can then be buffered output at a standard 3 pin output connector which is connected to a 3D enabled television to provide the video and synchronization signals.

An optional authentication I²C box can control which game providers have access to the 3D display capability. Software driving all game platforms is 3D compatible, but there are no provisions for automatic 3D capability because the games do not provide a page flip signal for swapping eye views although they are capable of providing stereo video output. The video game boxes generate synch signals (i.e. page flip signals) internally and the present invention allows the USB stack to instantiate a semaphore to look at the video engine and provide an indication when the sync signal is present. Thus, one aspect of the present invention is accessing the USB stack to extract the synch signal (off the USB port). The information for left/right eye views is accessible through the USB port, and a modification of the USB signal stack extracts the desired signal.

The present invention applies to any serial type port (firewire, CAN, SM bus, I²C, vaporwire) and any peripheral expansion bus. By utilizing one aspect of the present invention, the video game operating system is enabled to instantiate a device driver with an observer in the video engine to communicate directly with the USB stack down to the hardware and through the USB port.

Figure 11:
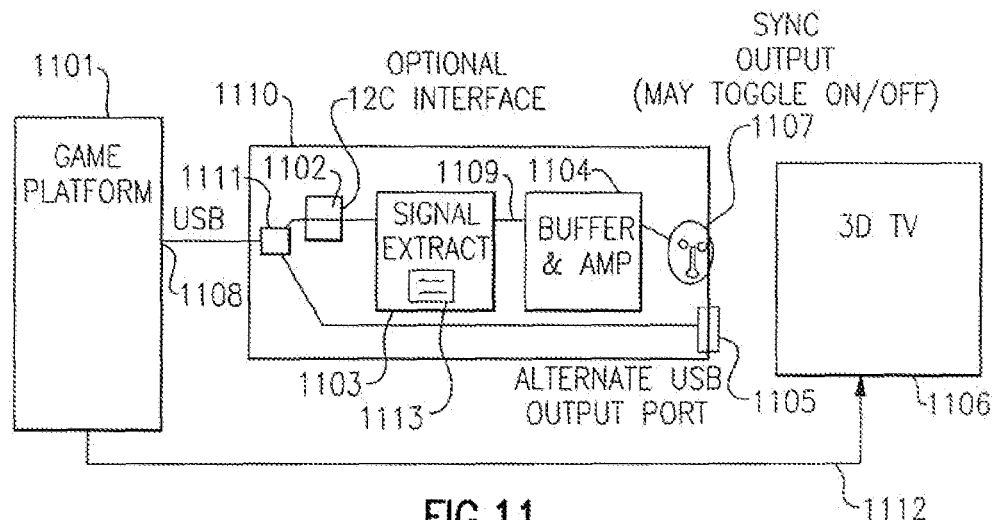
FIG. 11 illustrates a universal adapter for a game platform.

This approach is shown in FIG. 11. In the preferred embodiment, we extract 1103 the game platform 1101 timing signal 1109 from the video output at the USB interface 1108, buffer and amplify it 1104, and re-route it to the stereoscopic trigger output 1107 leading to the imaging device (for example, a rear projection DLP-based television) 1106. Optionally we may use electronic filtering to remove unwanted noise or other signal components using standard methods available in electronic design. The video signal can be split among multiple outputs 1105 via an internal USB hub 1111 so that one game platform can drive several displays, or can select which display is driven by the game platform, or simply replaces the USB port 1108 on the game console to enable use of other USB devices, for example, game controllers. The input video data stream 1112 is transmitted from the game platform to the 3D TV via the usual cable connected to a DLP projector system, for example.

Figure 12:
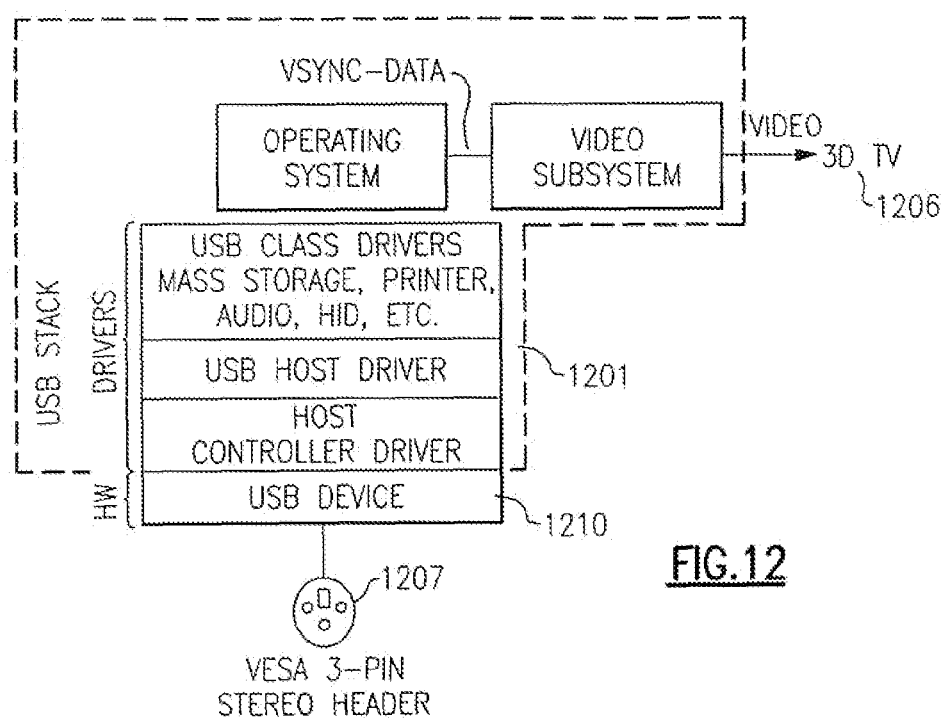
FIG. 12 illustrates a typical game platform USB stack coupled to a USB device and a 3D television.

With respect to FIG. 12, relevant internals of the game platform is illustrated at 1201 and includes, among others, a host controller driver, USB Host Driver, USB class drivers, an operating system, and a video subsystem. The present embodiment is represented as a USB device 1210 in FIG. 12 with extracted sync signals output at 1207. The software device driver 1113 for the present embodiment would enable stereographic display mode by communicating via the USB stack to the video subsystem to send the page flip signal out the USB port. This would be considered an unclassed USB device and require a special driver. When the Stereographic Projection Adapter is plugged into the USB port, the driver is activated and begins to inspect the video subsystem status, via the operating system, such as the vsync and stereo page register which indicates whether the right or left eye view is being transmitted, and extracts the sync pulse data therefrom and outputs the sync pulses at the USB output, identified as 1108 in FIG. 11. The driver will activate the stereographic output capability of the game system simultaneously with extracting the sync pulses so that the standard game system multiple stereographic image streams are output through the USB port together with the sync pulses.

It is also important that when buffering the signal, our invention can force authentication of the attached device (for example, using an I²C interface or similar methods). For example, today the I²C is used as an industry standard interface to authenticate when a pluggable electronic component is inserted into a socket. There is a simple exchange of electronic signals between the pluggable device and the socket, which may include information such as the part number of the pluggable device, manufacturer, etc. If the component is from an approved source, it is allowed to connect to the rest of the system, otherwise it is disabled, according to the I²C standard.

This approach could be used to allow only selected devices to attach into the stereoscopic system (for example, only game platforms from qualified vendors, or from known compatible technology). The permissions would be provided by the I²C interface in our invention, and would only be disclosed to those peripheral manufacturers who agreed to offer compatible components or to license the platform. Components which are not from authorized sources would not be allowed to connect to the system. The handshaking protocols of the I²C interface are well documented, see e.g. Royal Phillips website by pointing any web browser to the world wide web at "semiconductors.philips.com/acrobat_download/literature/9398/39340011.pdf," and serve as an example of the type of authentication required.

Alternately, the analog VGA television ports can be used as an interface for our invention, and authentication can be enforced through this interface. Authentication can also be used to enforce other standards, for example by controlling attachment of game playing versus game developing platforms. In particular, the PlayStation™ has enabled open source development by issuing a version of its console that can create and test new games. During development of three-dimensional games, it might be desirable to enable or disable the stereoscopic interface dynamically, as can be done using our invention. FIG. 11 illustrates an optional toggle function incorporated with the sync signal output. Since many game platforms also function as DVD players, the present invention can also be used to control access to the stereoscopic features when playing DVDs on a game platform (for example, enabling or disabling the features as needed).

At present, the PC generated stereo VGA data stream is an analog signal, with about 300 MHz of bandwidth (or about 150 MHz per each 2D image), which can be broken down as follows: (1024×768×4 bits×1 byte/8 bits)×120 Hz refresh rate=279,429,120 bytes per second to the RAMDAC memory on the video card (most video cards come with a 300 MHz RAMDAC, and acceptable video can be obtained from processing around 120 Hz (or 60 Hz per eye view). Obviously, as video image and optical technology advances, these numbers will change, however, the utility of the present invention will still be applicable.

Figure 13:
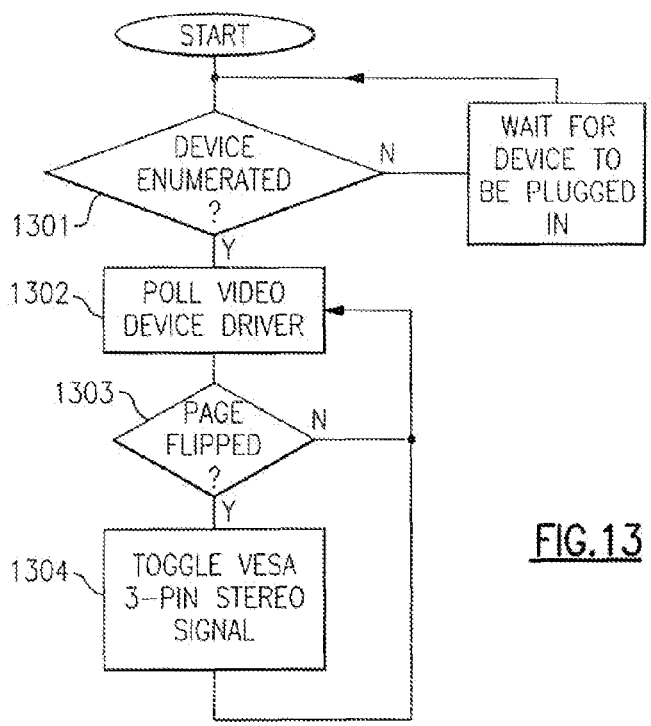
FIG. 13 illustrates a flow chart for extracting game platform vsync signals.

With respect to FIG. 13, the method of the present embodiment is illustrated, as implemented by programming code 1113. When a USB (or any bus device like it) device is plugged into the game platform USB port, it is assigned a unique ID. This is referred to as enumeration and the first step of the present embodiment 1301 determines whether the device has been enumerated. Once plugged in, a device advertises that it is there and would like an address, it also informs the USB hub of its power requirements (as USB devices are only allowed to use 100 mA until granted more by the USB stack).

Next, at 1302, after the device has been plugged in and enumerated, when the device is ready to be used the driver will poll the video device driver, or the vsync register, or the video address space, perhaps at a very high rate on the order of 1 khz or more, to see if the left or right page is being displayed. The video driver advertises this and polling is one method to obtain this information. Simultaneously, the device driver will automatically signal the game platform to enter page flip stereo mode to begin transmitting both image views in multiple image streams. When a page flip signal is detected at 1303 the output is toggled 1304 to transmit a sync pulse corresponding to the detected page flip signal. An alternate method takes advantage of the video subsystem's generation of an interrupt on the Vertical Synch signal it outputs. The USB driver can be made aware of this interrupt, and append code to it to poll only on vertical sync pulses. This is more efficient because page flips obviously always occur at a vertical sync pulse. The sync signals detected in this way from page flipped platforms 1303 are then provided via an output, in this example a 3-pin stereo output.

Multiple Polarizing Filters

Another embodiment of the present invention is operative to increase the light output of stereographic projector hardware when the projector is not in 3D or stereo mode. When 3D mode is turned off, the stereographic projector video data bypasses the Stereo Projector Apparatus 3D circuitry and is projected directly in 2D mode by the DLP projector apparatus. In the projector market space a premium is paid for greater brightness which often prohibits the use of a stereo projector when desiring to view normal content at optimal brightness. The reason is that current projectors which implement a polarizer attenuate light beams through absorption if they are not aligned with the transmission axis. This effect may be reduced by using higher illumination, such as by controlling the lamp current/voltage so as to operate at higher power and produce more light when in stereo mode. However, this reduces the lifetime and reliability of the lamp, wastes energy, and requires some additional lamp control hardware. It is desirable to increase the image brightness when the system is not operated in stereo mode without changing the lamp brightness.

Figure 14A:
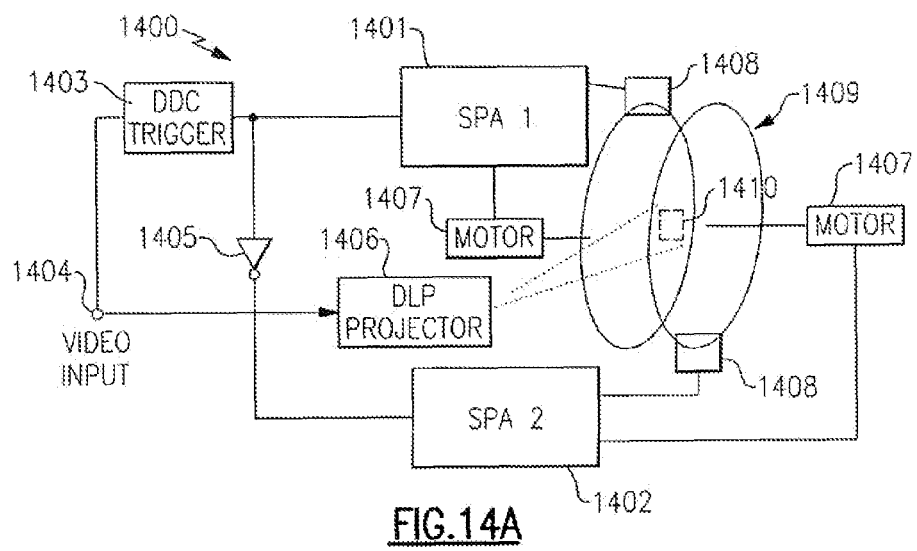
FIGS. 14A-C illustrate a flow chart and implementation details of a dual filter wheel system.

Referring to FIG. 14A, there is illustrated an implementation of the multiple polarizer embodiment. The multiple phase locked wheels are locked in phase to a higher order system 1400 operative to control the phase and frequency of the combined wheel assembly. This implementation system utilizes two of the previously described 3D circuits in parallel. A first and second stereographic projection apparatus ("SPA"), 1401 and 1402, is coupled in parallel, each to a separate polarizer wheel 1409. Each of these contain a phase/freq detector, a loop filter, a motor controller, and a divide-by-n circuit, all as detailed above with respect to FIG. 3A. Each of these also receive a tach signal from a tach sensor 1408, coupled to their respective polarizer wheel, and a page-flip signal from the field converter 1403, which is directly coupled to SPA1 1401 and is coupled to SPA2 1402 through an inverter 1405. As described in relation to FIG. 3A above, a video stream input 1404 is provided in parallel to both the DLP projector 1406 and to the field converter 1403. The use of the inverter assumes that the tach sensors are effectively in the same position on each of the filter wheels. The use of this inverter is optional and must be selected with consideration of the location of the tach sensor marks that are placed on each of the filter wheels. If the marks are in such a location on the filter wheels, and the tach sensors are also suitably located at circumferential positions, that the tach sensors are triggered when the wheels are 180° out of phase with respect to their clear and polarized regions then an inverter is not needed. Each SPA's motor controller thereby controls corresponding motors 1407 such that a polarized segment from one of the polarized wheels is always in the path of the projected image 1410, projected by DLP projector 1406. When the stereo sync signal is removed, the projector firmware will force alignment in the transparent state.

Figure 14B:
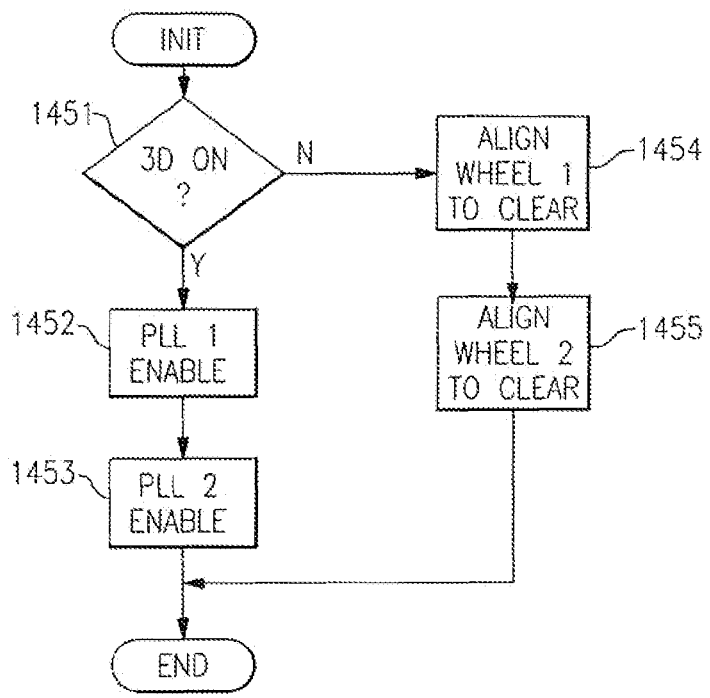

Referring to FIG. 14B, a method of operating this implementation is illustrated. At step 1451, the system determines if 3D stereo mode is activated. If it is, then at steps 1452 and 1453, the two stereographic circuits are activated, as discussed below. If, at step 1451, the system determines that 3D stereo mode is not activated then system firmware, optionally a part of the motor controller, will direct the motor controller to align the clear segments in the projector lights beam path, at steps 1454 and 1455, so that both of these segments are "parked" in a position to maximize brightness of the projected image. Therefore, selected locations of markings on the filter wheels and a circumferential location of the tach sensors must be positioned so that when the filter wheels are parked the wheel marks are stopped directly in the sensors LED path and the clear sections of the filter wheels are in the projector's light beam path. Commonly known motor control firmware implemented in the motor controller, appropriately programmed, will utilize such positioning for correct operation.

Figure 14C:
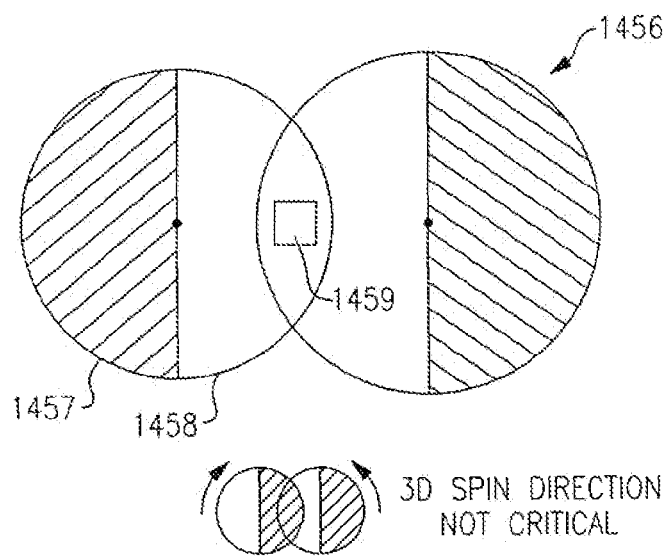

Using a single polarizer that rotates in phase lock with a video signal always attenuates the light, even when the polarizer is not needed or is inactive such as when viewing non-stereo content. Referring to FIG. 14C, this problem can be addressed by utilizing two or more rotating polarizing filter wheels 1456, each containing a clear portion 1458, and a polarized portion 1457, or, in other words, composed of an integer multiple of polarizing and clear segments. The polarized sections of the filter wheels are polarized orthogonally to each other such that when they are alternately filtering the projected light beam it will be alternately polarized orthogonally (90° offset)—one for the left and eye and one for the right eye. By driving each filter wheel by a separate motor, the filter wheels can be parked in a position where both transparent segments overlap in the projector light beam's path 1459 when 3D operation is not desired, thereby eliminating the problem of light beam attenuation associated with the single polarizer systems. During stereographic display mode, for the case of each wheel containing a single polarized and single clear segment, the wheels would rotate out of phase 180° of each other, so that one polarized segment of one of the wheels is always in front of the light output stream 1459. The spin direction of the wheel is not critical in this implementation.

Signal Synthesizer for Periodic Acceleration and Deceleration

The present invention, embodiment shown in FIG. 3A with accompanying description, can be improved by more precisely controlling the rotation of the filter wheel. Because the filter wheel contains regions that are more effective for producing a 3D effect, the angular rotation can be increased for those portions of the wheel located between the most desirable polarization regions. When the in-between regions are in the light projection pathway, i.e. they are filtering the projected image, the wheel speed can be increased to lessen the time duration that the in-between regions are in front of the projection light source. This would cause the desired polarized regions of the wheel to filter the projected images for a longer duration at the desired polarization angles. This is illustrated in FIG. 15C which illustrates a filter wheel 1550 and the regions thereon containing four of the desired polarization states 1530, labeled as either left "L" or right "R" regions where the polarization angle is either 0°, 90°, 180°, or 270°. It is preferable that the wheel spin more slowly when these regions 1530 are in the image projection path, i.e. when they are filtering the projected image, and that the filter wheel spin more quickly between these regions 1540.

Figure 15A:
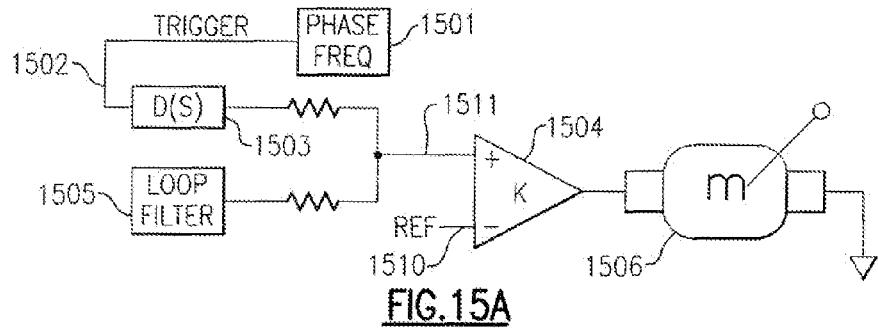
FIGS. 15A-C illustrate implementation details of a disturbance synthesizer.
Figure 15B:
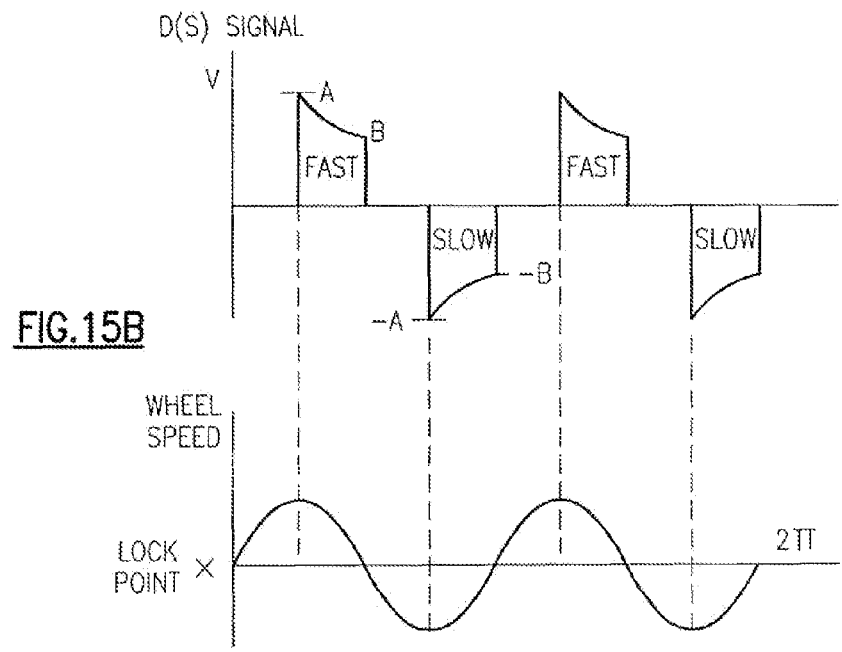
Figure 15C:
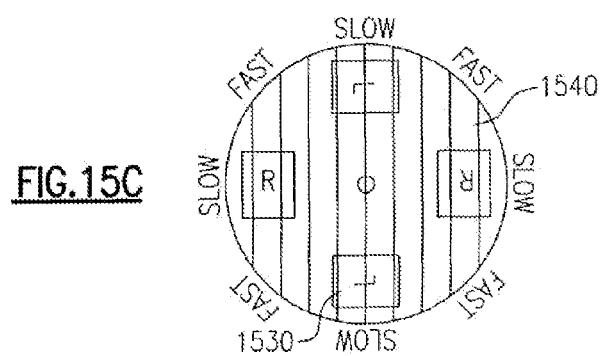
Figure 16:
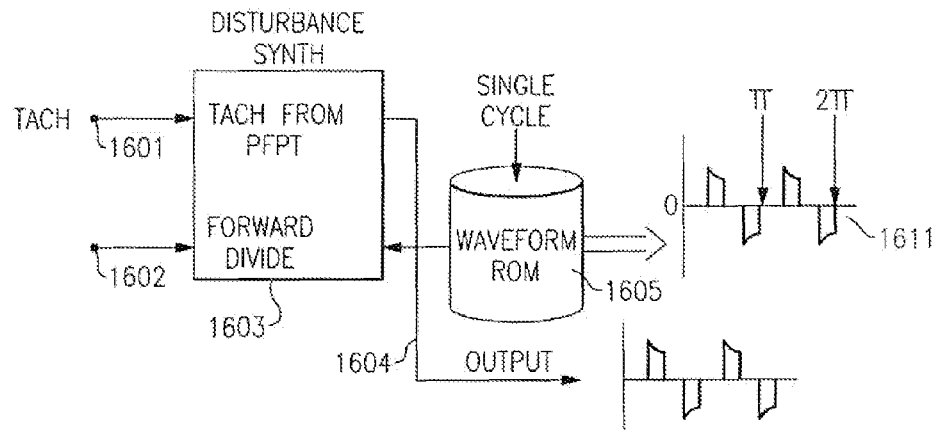
FIG. 16 illustrates a disturbance synthesizer.

Referring to FIGS. 15A-C, this performance can be achieved by subjecting the motor drive amplifier 1504 to a bipolar truncated exponential error or perturbation signal, which can be generated and applied to the motor as follows. Referring to FIG. 16, there is illustrated a frequency adaptive ROM based disturbance synthesizer which generates the disturbance or "error" signal that will be applied to the filter wheel drive motor. One skilled in the art can easily appreciate that such waveforms may also be calculated in realtime using Taylor series, matrix operations, trigonometric functions, logarithms, and other mathematical methods. In FIG. 16, the disturbance synthesizer 1603 takes an input from the Tach Sensor at 1601, and the waveform ROM 1605, e.g. a data array in a DAC, and includes a forward divider whose input 1602 depends on the characteristics of the rotating filter wheel, such as RPM and the number of aspects provided in the wheel. The desired output disturbance signal is obtained from a look up table stored in memory, e.g. a waveform ROM 1605 can be used as the trigger engine storing a single cycle's worth of data such as the $2\pi$ radians waveform shown at 1611.

In this design, the speed of the filter wheel as output from the tach sensor and received at 1601 sets the speed at which the ROM single cycle data is indexed. The divide ratio is derived from the number of polarization states per wheel, e.g. 4. Therefore, if the ROM stored output is $2\pi$ radians then the forward divide ratio is 1 for every tach signal pulse. This is the example of FIG. 16 where the stored ROM table 1605 would contain the output shown 1611. The disturbance synthesizer itself adjusts the amplitude and frequency to produce the adjusted actual output 1606.

This disturbance signal has two important properties elemental to this invention working properly: this signal is synchronized with the phase and frequency reference in systems that are phase and frequency locked; and the signal is synchronized in frequency for systems where phase lock is not important. Phrased another way, the signal is cyclostationary with respect to the rotating optical device. This inventive improvement is implemented as a servo-like motor control system, whereby velocity and position are controlled to achieve this periodic variation in speed. It is obvious to one skilled in the art that such controllers are readily implemented with analog circuits, digital control devices such as Digital Signal Processors, Microprocessors, Microcontrollers, discrete logic and semiconductor devices, software, firmware, or any combination thereof. Some practical considerations need to be observed in this technique. In the case where the motor is slowing down, the energy stored in the rotating mass is converted to heat in the drive amplifier, or redirected back into the power supply, where it will either elevate the supply rail voltage, or be dissipated as heat.

Figure 17:
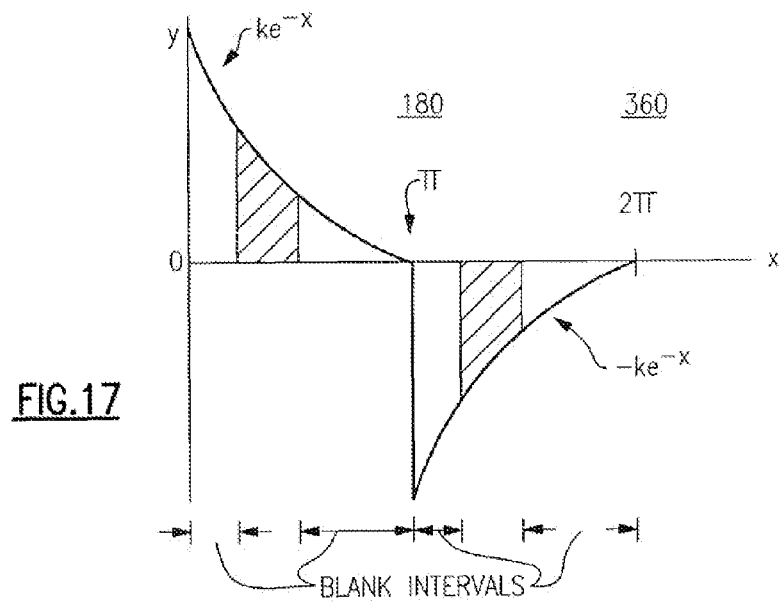
FIG. 17 illustrates an analysis of a waveform for the disturbance synthesizer.

Referring to FIG. 17, the waveform data stored in the ROM can be calculated once based on system performance and characteristics, such as moment of inertia, motor torque, etc. which is then represented in the constant value k in the following equations. The equation for calculating the bipolar truncated exponential drive function is, for example, $ke^{-x}$ for 0 through $\pi$, and $-ke^{-x}$ for $\pi$ through $2\pi$, resulting in the waveform shown in FIG. 17, which is then truncated with respect to bands of degrees calculated as a function based on phase shift tolerances. Available phase margin is divided by the number of aspect positions in the filter wheel which provides the minimum blanking intervals shown in the Figure. If the blanking intervals do not truncate the disturbance signals sufficiently, interference with the feedback control may cause unwanted instability.

Further implementation details and resulting performance improvement are illustrated in FIGS. 15A-C. In reference to the figures, the motor 1506 is typically driven by an amplifier 1504 output voltage. In accordance with basic control theory this amplifier typically has a reference input signal 1510, for setting a quiescent operating point, or idle speed, determined by typical video signal common refresh rates, which in this implementation would be 2.5v as described in the discussion above for FIG. 4, where the voltage supplies are 5v and 0v. A command input signal 1511 controls deviations from the reference. A disturbance signal is synthesized as described above, represented in FIG. 15A as D(s) 1503 and applied at one of the amplifier inputs 1511 together with the normal motor control output from the loop filter 1505 as described above. The disturbance signal, shown in FIG. 15B and as described above, is applied together with the normal motor control signal and perturbs the motor control signal such the motor periodically accelerates and decelerates in a prescribed fashion as shown in the wheel speed graph of FIG. 15B, and as described above. The trigger signal 1502 provided to the disturbance synthesizer is provided by the phase/freq detector 1501 as it is received from the tach sensor, as described above. In the figures shown, the perturbation signal is a bipolar truncated exponential, however it is appreciated by anyone skilled in the art that this could be saw tooth, sinusoidal, ramp, or any arbitrary signal supplied by the appropriate synthesizer, so long as it's correlated to motor torque constant, and moment of inertia.

In the case where the motor is accelerating, the amplifier supplies energy to the motor to accelerate the rotating mass to the desired speed for a given interval. In either case, power supply disturbance can be mitigated by providing adequate decoupling capacitance to the motor amplifier ($\frac{1}{2} C \times V^2$ of the capacitor versus $\frac{1}{2}$ mass$\times$angular velocity$^2$). This capacitance can be a significant performance element of the system if said system is composed of non-ideal components.

Synchronizing Opto-Mechanical Filters to a Series of Video Synchronization Pulses Another preferred embodiment of the present invention is operative to synchronize a rotating or linear/angular actuating mechanism used to control an optical filter element in an image projection system. One example of a rotating electromechanical mechanism is a brushless DC rotator, but such an embodiment is only an example and the claims are not limited to only such an embodiment. Other examples of electromechanical embodiments which can be applied to position optical filters or polarizers within an imaging system include permanent magnet synchronous devices, sensorless BLDC, Switched Reluctance, Mechanically commutated machines, AC induction, synchronous AC induction, and field deflection servo apparatus, as well as other electro-mechanical systems which will be apparent to one skilled in the art. The synchronization is to a series of pulses derived from an analog or digital video source which are compatible with industry standard video signaling and encoding systems, or to the derivatives of these pulses.

This synchronization is accomplished with enhancements to the invention as referenced in FIG. 3A, and is preferentially implemented in firmware although a pure hardware or software implementation is also feasible. This system provides adequate phase and frequency response; however, the performance requirement criteria for systems with intrinsic large moments of inertia are often unattainable using this method. To clarify, a large mechanical actuator may need to rapidly accelerate or decelerate. If such a machine had sufficient inertia, there would be two fundamental problems which the present embodiment overcomes. The first is that this change may take an impractically long time to occur depending on the system dynamics. The second issue that arises is that this could take enormous quantities of energy to do quickly. This translates into high loop gain, which causes excessive noise sensitivity, decreased phase margin, and accompanying potential loss of stability.

Figure 18:
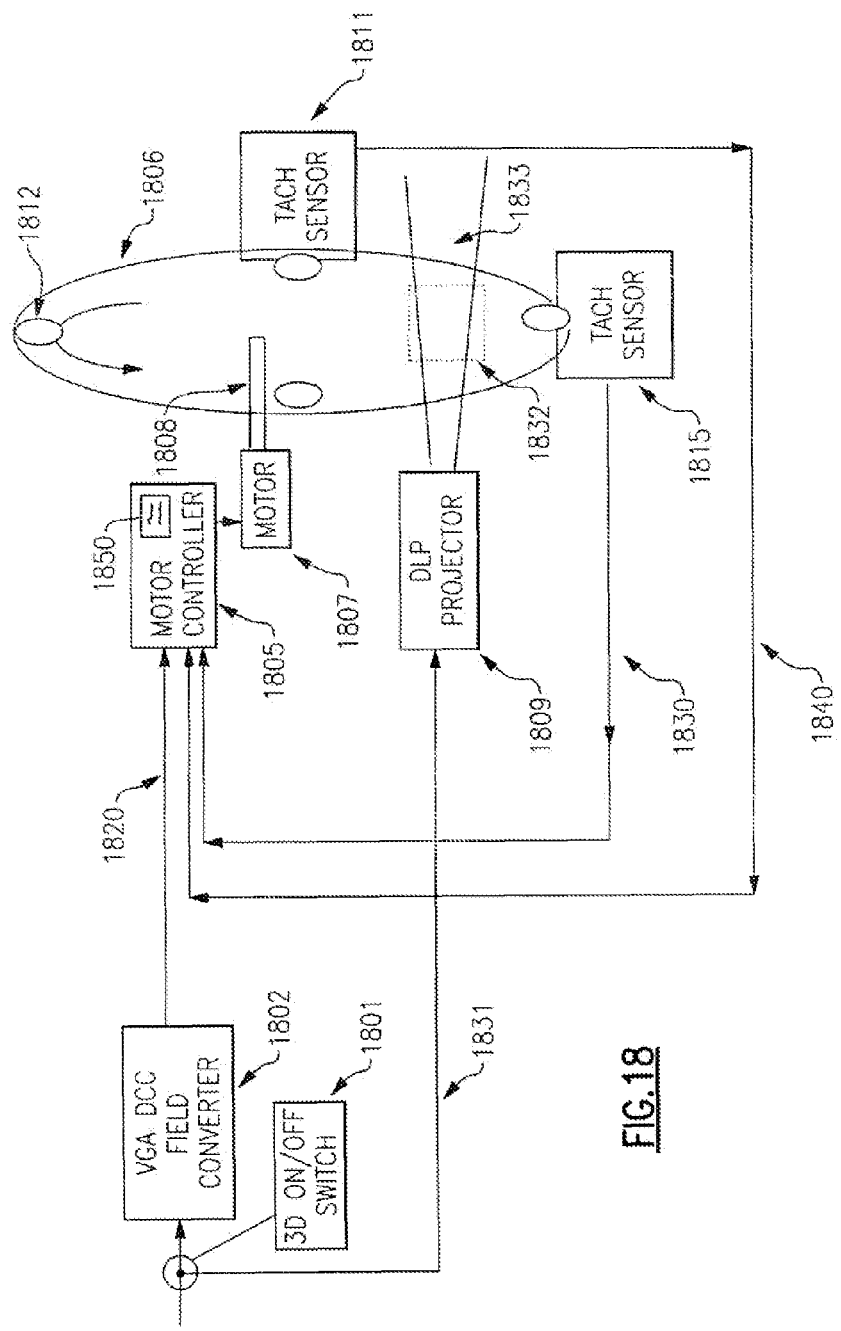
FIG. 18 illustrates a stereographic projection system using a stepper motor control that reduces hardware requirements.

FIG. 18 illustrates the system implementation of this preferred embodiment of the invention. Similar to the system of FIG. 3A, the implementation of FIG. 18 includes stereographic video data entering the system through switch 1801 wherein a field converter 1802 extracts sync signals, or page flip signals, 1820 and forwards them to motor controller 1805 comprising motor control program logic 1850. A stepping motor 1807 (example shown in FIG. 19A with corresponding description) is coupled to spindle 1808 which, in turn, rotates filter wheel 1806. The filter wheel in this embodiment comprises four markers 1812 and two tach sensors 1811 and 1815, which each are capable of detecting opposing pairs of markers 1812, as explained in more detail below. The tach sensor signals 1830 and 1840 from corresponding tach sensors 1815 and 1811 are received by motor controller 1805 which, through internal programming 1850, synchronizes the stepper motor waveform drive signals, exemplified in FIG. 19B, with the page flip signals such that polarization states 1832 of the filter wheel 1806 temporarily pause in the image projection path 1833, of the DLP projector 1809. The DLP projector projects video data 1831 received through switch 1801. This preferred embodiment does not require the phase/freq detector, loop filter, or divide-by-n circuit previously described with reference to the system of FIG. 3A.

Figure 19A:
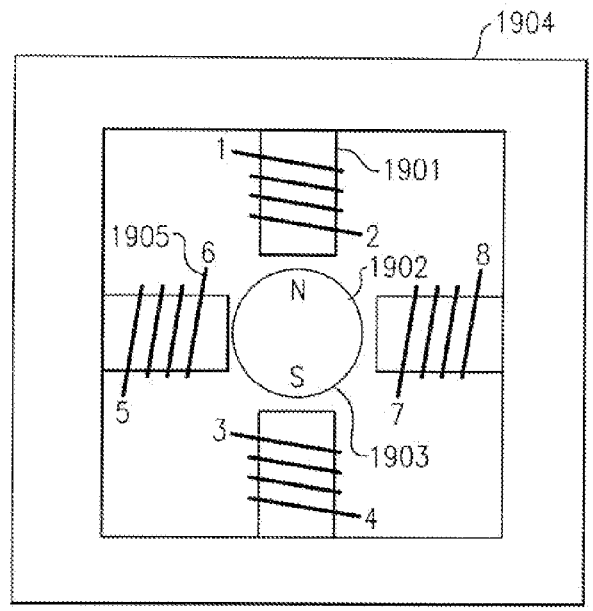
FIGS. 19A-B illustrate a stepper motor with drive signals.
Figure 19B:
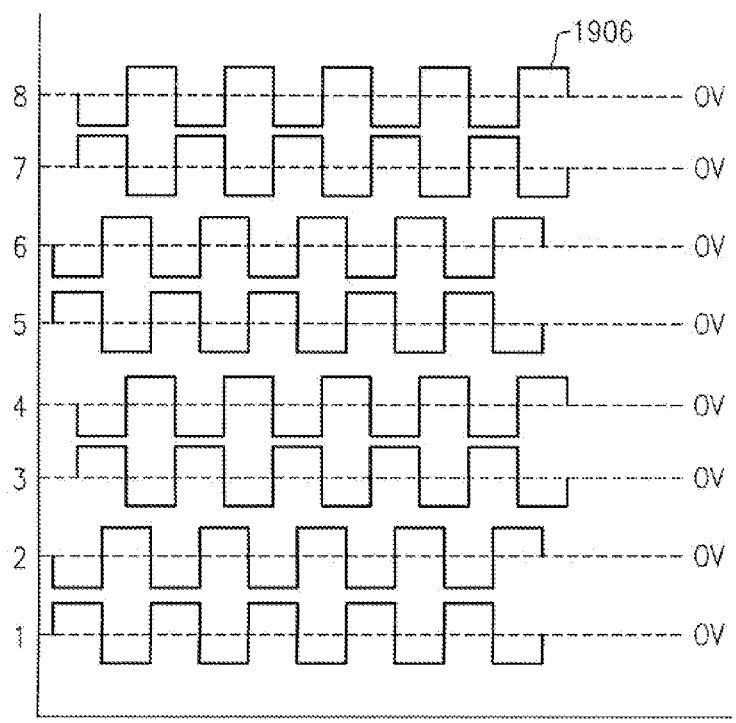

FIG. 19A illustrates a permanent magnet stepper motor 1904, having a step angle of 45°, with four stator legs 1901 having windings 1905 for inducing rotation of the rotor 1902, having labeled north and south poles, when they are sequentially energized by applying voltage to the windings. Conventional programmable quadrature drive waveforms are shown in FIG. 19B which will induce continuous quiescent rotation of the rotor 1902 when the step voltage waveforms numbered 1-8 are applied to corresponding numbered winding terminals. In this example embodiment (for ease of description) each step will induce a stepping torque and turn the rotor 45°. Many motor devices are available at degree steps of 15, 7.5, 9, 1.8, etc. with corresponding increase in stator legs, which can easily be implemented in our embodiment and are considered well within the scope of our invention. By implementing an idle function illustrated in FIG. 19B the system will run to a quiescent speed during a power on event, even in the absence of a phase/frequency reference. At any instant of time, the DC voltages indicated in the voltage waveforms of FIG. 19B could be held constant and the motor would be locked in position by an induced holding torque.

Figure 20A:
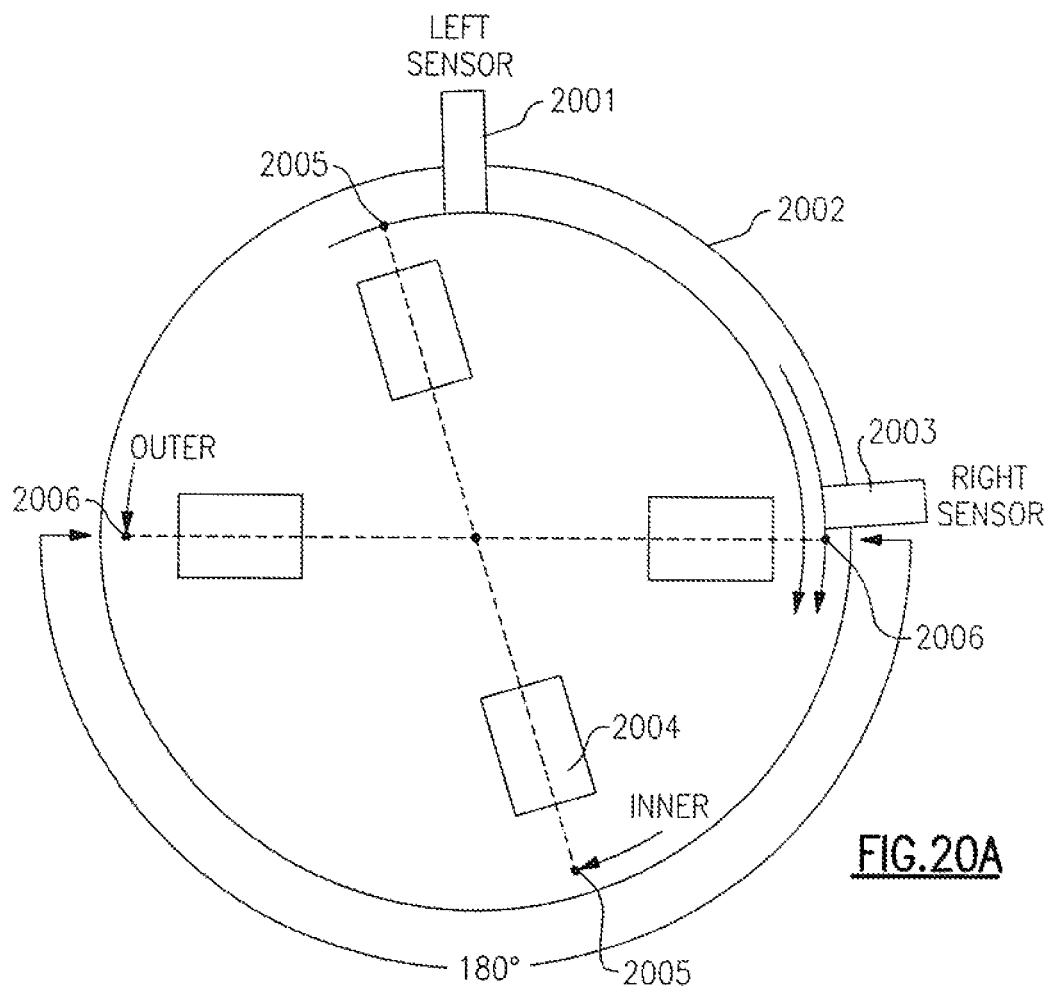
FIGS. 20A-B illustrate a polarized filter wheel for use in the system of FIG. 18.

Referring to FIG. 20A, there is illustrated a marked polarized filter wheel 2002 according to this preferred embodiment of the present invention. The filter wheel comprises a plurality of markers, e.g. markers 2006, which are a pair of markers disposed substantially 180° apart on the wheel, and markers 2005 also separated by substantially 180° on the filter wheel, with each pair separated from each other by 90°. Markers 2006 are disposed thereon such that they are on the same radial path but separate from that of markers 2005. In the example, of FIG. 20A markers 2006 are in a radial path that is closer to the edge of the filter wheel. Left sensor 2001 and right sensor 2003, which are substantially similar to the tach sensors described above, are situated substantially 90° apart to detect both of their corresponding markers, 2005 and 2006, respectively, but do not detect markers corresponding to the other sensor.

Figure 20B:
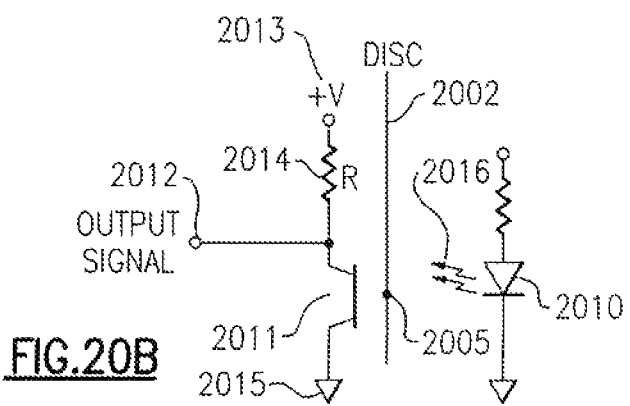

Referring to FIG. 20B, there is illustrated a tach sensor circuit implemented by left and right tach sensors 2001 and 2003. Disc 2002 rotates between light transmitting semiconductor 2010, for example an LED, and photosensitive transistor 2011 wherein the disc marker 2005 is capable of blocking the light 2016 emitted by LED 2010. When the light is blocked transistor 2011 turns off and a logical high signal is transmitted at output 2012 to motor controller 1805. Photosensitive transistor 2011 is coupled to ground 2015 and to voltage source 2013, as shown, through resistor 2014. Similarly, LED 2010 is coupled to ground and is powered by a voltage through a resistor.

Referring to FIG. 21, there is illustrated an example control waveform 2104 that is synchronized to the page flips signals 2101 and the position of the rotating polarizing filter of FIG. 20A for temporarily stopping the rotating filter at each of its four orthogonal polarization states 2004 in the path of the projected image data. For simplicity of description, there is only one control waveform shown for the motor step pulses 2104, as compared with the eight waveforms shown in the implementation of FIGS. 19A-B. By extension, the following description can readily be applied by one skilled in the art to any size stepper motor having any number of stator legs. In the example waveforms 2104, there is illustrated four motor drive pulses 2107 required to advance the filter wheel to the desired polarization aspect. Since these aspects are separated by 90° in the filter wheel implementation of FIG. 20A, these motor drive pulses indicate that the target drive motor is a 22.5° stepper motor.

Referring to FIG. 21, left polarizer good ("high") 2102 indicates that a viewer's left eye view, when wearing passive eyewear as described above, is unblocked in order to see the projected image and that the right eye filter wheel polarization is orthogonal to the right side eyeglass polarization of the viewer wearing passive eyewear, thereby blocking his right eye view. Right polarizer good ("high") 2103 indicates that a viewer's right eye view, when wearing passive eyewear as described above, is unblocked in order to see the projected image and that the left eye filter wheel polarization is orthogonal to the left side eyeglass polarization of the viewer wearing passive eyewear, thereby blocking his left eye view. In simple terms, with greater detail to follow, when a sensor, either left or right, detects its corresponding marker the stepping motor is stopped for the duration.

Page flips signals 2102 are input to the motor controller and comprise the reference to which the motor controller logic will drive the filter wheel. Each of the page flip signal's high state 2106 and low state 2105 corresponds to a left or right eye view being transmitted by the projector. In the present example embodiment, we are indicating right eye data with a logical high 2106 as described with reference to discussion of FIG. 3B. In the received signals from the left and right sensors 2102 and 2103, respectively, the high voltage levels correspond to the sensors detecting the marker. These are the time intervals when the filter wheel is paused because the polarization state presented by the filter wheel to the projected image beam is at a desired polarization angle that is orthogonal to a polarization angle of one of the lenses in a viewer's eyeglasses. The example motor drive signal 2104 indicates a temporary pause due to the absence of drive pulses during any of the sensors detection states ("high"). For the left polarizer sensor "good" signal, interval 2108 indicates a temporary pause in driving voltage, thereby stopping the motor during the interval. For the right polarizer sensor "good" signal, interval 2109 indicates a temporary pause in driving voltage, thereby stopping the motor during the interval. These control signals and pulses continue indefinitely as long as the projection implementation of FIG. 18 is running. These pulses are generated in response to programmed motor control logic 1850 in the motor controller as described more fully below.

Figure 22:
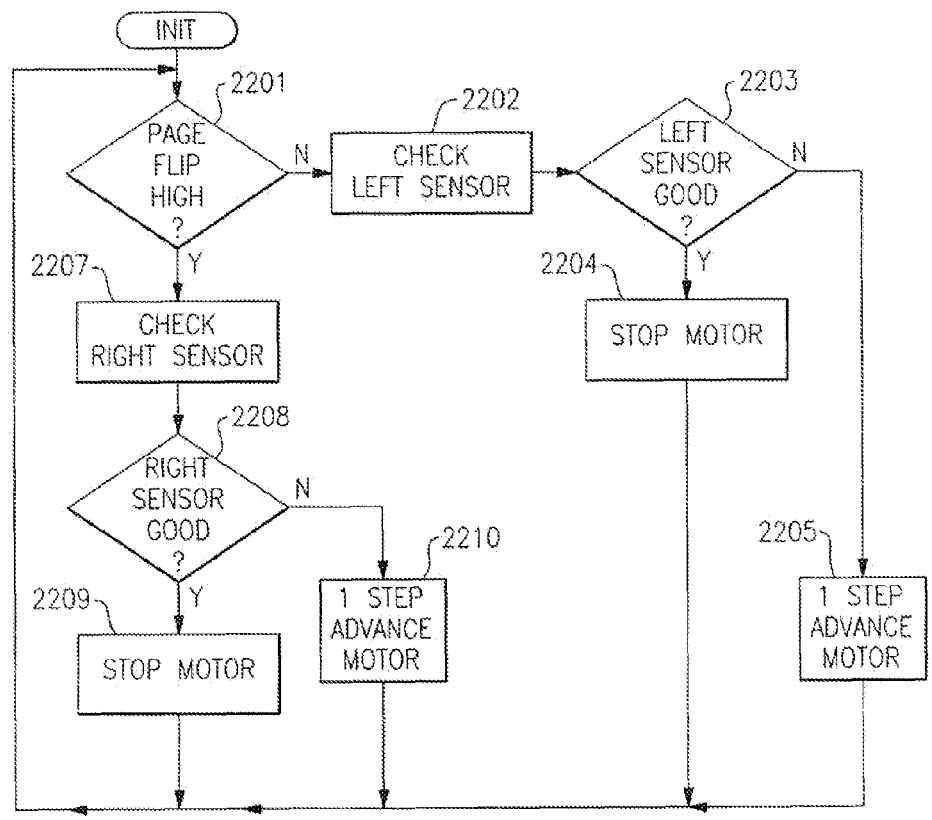
FIG. 22 illustrates a flow chart of the motor controller programming.

Referring to FIG. 22, illustrated is a flow chart of the motor control logic programming 1850 according to the preferred method of the present embodiment. After initialization, the status of the page flip signal is determined at 2201. If the page flip signal is low, indicating the presence of left eye view data in the incoming video data, then the program branches to 2202 to check the status of the left sensor, and if the page flip signal is high, indicating the presence of right eye view data in the incoming video data, then the program branches to 2207 to check the status of the right sensor. If the page flip signal is low, then, at step 2203, the left sensor is checked as to whether a left marker is detected on the filter wheel by the left sensor, e.g. left sensor is "good", which would be indicated by a logical high level. If the marker is not detected, i.e. left sensor is not "good", then the motor is advanced one step at 2205, corresponding to transmitting one motor step pulse at 2107 (which shows four pulses total), and the page flip signal status is checked again at step 2101. If the motor of FIG. 19A, having a step of 45°, was implemented, then in this situation two cycles through the algorithm would advance the motor approximately 90°.

If, after checking left sensor at step 2202, the marker is detected at step 2203, then at step 2204 the motor is stopped because the detected marker indicates that the filter wheel is in the correct effective orthogonal polarization position, and the page flip signal status is checked again at step 2101. (This is also indicated by the motor step waveform 2104 of FIG. 21, wherein the voltage is at a holding level when the sensor is in a "good" position.) This hold position is maintained for the duration of the marker's presence in the left sensor, which might cycle through the programmed algorithm many times.

If, at step 2201, the page flip signal is high, then, at step 2207, the right sensor is checked as to whether a right marker is detected on the filter wheel by the right sensor, e.g. right sensor is "good", which would be indicated by a logical high level. If the marker is not detected at step 2208, i.e. right sensor is not "good", then the motor is advanced one step at 2110, corresponding to transmitting one motor step pulse at 2107, and the page flip signal status is checked again at step 2101. If the motor of FIG. 19A, having a step of 45°, was implemented, then in this situation two cycles through the algorithm would advance the motor approximately 90°.

If, after checking right sensor at step 2207, the marker is detected at step 2208, then at step 2209 the motor is stopped because the detected marker indicates that the filter wheel is in the correct effective orthogonal polarization position, and the page flip signal status is checked again at step 2101. (This is also indicated by the motor step waveform 2104 of FIG. 21, wherein the voltage is at a holding level when the sensor is in a "good" position.) This hold position is maintained for the duration of the marker's presence in the right sensor, which might cycle through the programmed algorithm many times.

Advantages of the Invention

Our invention can operate on projection systems with one, two, or three digital mirror devices ("DMD"), wherein more devices are used to improve color contrast and resolution. Our invention allows for a second rotating polarizer to be placed outside the projector. In this way, any existing projector can be modified to provide a 3D effect. Our invention includes, among others, one embodiment that provides both frequency and phase lock between the rotating polarizer and the projector signal, or the ability to handle either line interleaved or frame sequential video. Line interleaved has no flicker, but the resolution on the interleaved axis is reduced by half. Frame sequential has some flicker, but maintains full resolution along both axes.

Another embodiment of our invention implements a fourth order feedback control loop and circuit design, which provides four unique lock and capture points for the frequency/phase sync between the DMD signal and the rotating polarizer. There are four stable points on the root locus of the feedback control circuit. This insures stability of the feedback loop which provides phase/frequency sync. It will be apparent to one skilled in the art that modifications to our fourth order control system are possible which do not substantially change the basic invention.

Our invention requires only a single sheet of linear polarizer material, rather than polarized segments. Our invention includes the ability to spin the polarizing wheel at a different rate than the DMD signal or color filter wheel, providing another control variable for adjusting the DMD signal (for example, to accommodate smoothing between adjacent pixels) or for improving system resolution (for example, by introducing frequency or phase offsets between the DMD and polarizer signal).

Our invention includes an embodiment that is capable of 100% extinction between the two polarization states which we have experimentally verified. This is possible because it uses only a single polarizing sheet. Since our invention does not require modification to the projector filter wheel (which is a precision balanced component spinning at thousands of RPMs and higher), it becomes significantly easier to implement at lower cost. Furthermore, our invention can rotate the polarizing wheel at a significantly lower speed than the color filter wheel, simplifying the system mechanical design and improving reliability. Further, our invention allows for variation in the speed of the rotating polarizing elements, moving them faster at some points in the rotating cycle and slower at other points, to virtually eliminate color blur and flicker in the image.

Alternative Embodiments

It will be appreciated that, although specific embodiments of the invention have been described herein for purposes of illustration, various modifications may be made without departing from the spirit and scope of the invention. In particular, in one embodiment, the present invention addresses problems described above by controllably accelerating and decelerating rotation of the rotating optic, either integrated or separate, at various angles. It is possible, using stepper motors, that the rotating element can be fixed for an arbitrary period of time at those positions which produce complete separation of the left and right eye images (that is, those positions for which the transmission axis is aligned with either the left or right eye filter in the viewer's glasses). Depending on the design of the polarizing wheel and viewing glasses, this may occur at several distinct positions on the rotating wheel. Another embodiment might take advantage of maintaining a quiescent rotation speed of the filter wheel during off periods of the 3D stereographic projection apparatus, thereby avoiding a ramp up delay that normally would be required until the motor reaches satisfactory operating speed. Yet another embodiment might provide an apparatus to modify incoming standard ATSC television signals carrying 3D signals to operate with the present stereographic projection apparatus. Accordingly, the scope of protection of this invention is limited only by the following claims and their equivalents.

We claim:

1. In a 3D projection system including a light projected image beam for projecting received stereographic image data, the image data comprising a plurality of image streams, a screen for viewing an image from the projected image beam, wherein the projection system alternately projects frames from each of the image streams, and comprises a rotating segmented color wheel having colored segments that provide color to the image by passing the image beam through it, an improvement comprising:
   a plurality of color sensitive detectors located in the image beam each for outputting a color signal when its corresponding color is detected in the image beam.

2. The improvement of claim 1 further comprising:
   an EXOR circuit coupled to the plurality of color sensitive detectors for outputting a white color signal when the plurality of color sensitive detectors each simultaneously output a color signal.

3. The improvement of claim 2 wherein the image data comprises sync signals corresponding to each of the image streams, and wherein the improvement further comprises a synchronization circuit coupled to the system for receiving the sync signals and coupled to the EXOR circuit for receiving one of the color signals, and for outputting a voltage signal whose magnitude and polarity are proportional to a difference in synchronization of the sync signals and the color signals.

4. The improvement of claim 3 further comprising:
   an alternating polarization filter in the path of the image beam and coupled to the synchronization circuit having a motor drive system controlling a frequency of its alternating polarization according to the magnitude and polarity of the voltage signal.

5. The improvement of claim 4 wherein the alternating polarization filter alternately polarizes frames from a first one of the image streams at a first polarization angle and frames from a second one of the image streams at a second polarization angle.

* * * * *